(12) United States Patent
Stokes et al.

(10) Patent No.: US 7,420,019 B2
(45) Date of Patent: Sep. 2, 2008

(54) METHOD FOR PREPARATION OF POLYOLEFINS CONTAINING EXO-OLEFIN CHAIN ENDS

(75) Inventors: Casey D. Stokes, Novato, CA (US); Kelby Simison, Marysville, CA (US); Robson F. Storey, Hattiesburg, MS (US); James J. Harrison, Novato, CA (US)

(73) Assignees: Chevron Oronite Company LLC, San Ramon, CA (US); The University of Southern Mississippi, Hattiesburg, MS (US)

( * ) Notice: Subject to any disclaimer, the term of this patent is extended or adjusted under 35 U.S.C. 154(b) by 32 days.

(21) Appl. No.: 11/207,377

(22) Filed: Aug. 19, 2005

(65) Prior Publication Data

US 2006/0041084 A1 Feb. 23, 2006

Related U.S. Application Data

(60) Provisional application No. 60/603,410, filed on Aug. 20, 2004.

(51) Int. Cl.
*C08F 8/32* (2006.01)
(52) U.S. Cl. ............... 525/379; 525/375; 525/374; 525/333.7
(58) Field of Classification Search ............ 526/348.7, 526/178, 180, 112; 525/375, 374, 333.7, 525/379
See application file for complete search history.

(56) References Cited

U.S. PATENT DOCUMENTS

| 4,152,499 A | 5/1979 | Boerzel et al. |
| 4,342,849 A | 8/1982 | Kennedy |
| 4,393,199 A | 7/1983 | Manser |
| 4,758,631 A | 7/1988 | Kennedy et al. |
| 4,910,321 A | 3/1990 | Kennedy et al. |
| 4,929,683 A | 5/1990 | Kennedy et al. |
| 5,066,730 A | 11/1991 | Kennedy et al. |
| 5,122,572 A | 6/1992 | Kennedy et al. |
| 5,219,948 A | 6/1993 | Storey et al. |
| 5,336,745 A | 8/1994 | Cheradame et al. |
| 5,428,111 A | 6/1995 | Faust et al. |
| 5,448,000 A | 9/1995 | Gullapalli et al. |
| 5,637,647 A | 6/1997 | Faust |
| 5,677,386 A | 10/1997 | Faust |
| 2004/0015029 A1 * | 1/2004 | Lange et al. ............... 585/521 |
| 2004/0260033 A1 | 12/2004 | Stokes et al. |

FOREIGN PATENT DOCUMENTS

| EP | 0 341 012 B1 | 12/1992 |
| WO | WO 99/09074 | 2/1999 |

OTHER PUBLICATIONS

Bae et al., Macromolecules, 30, 7341-7344(1997).*
Young Cheol Bae and Rudolf Faust, β-Proton Elimination by Free Bases in the Living Carbocationic Polymerization of Isobuytlene, Macromolecules, 1997, 30, 7341-7344.
Lars V. Nielsen, Rasmus R. Nielsen, Bo Gao, Jorgen Kops and Bela Ivan, Synthesis Of Isobutenyl-Telechelic Polyisobutylene By Functionalization With Isobutenyltrimethylsilane; Polymer, vol. 38 No. 10, pp. 2529-2534, 1997, Elsevier Science Ltd, Great Britain.
Bae et al., "The Role of pyridine Derivative In Living Carbocationic Polymerization: Lewis Base or Nucleophile?", *Macromol. Symp.*, vol. 132, pp. 11-23, 1998.

* cited by examiner

*Primary Examiner*—Ling-Siu Choi
(74) *Attorney, Agent, or Firm*—Sarita R. Kelley; Claude J. Caroli; Joseph P. Foley

(57) ABSTRACT

The present invention is directed to a method for preparation of polyolefins containing exo-olefin chain ends. The method involves quenching a cationic quasi-living polyolefin polymer system with one or more hindered secondary or tertiary amines.

49 Claims, No Drawings

METHOD FOR PREPARATION OF POLYOLEFINS CONTAINING EXO-OLEFIN CHAIN ENDS

This application claims the benefit of U.S. Provisional Application No. 60/603,410, filed Aug. 20, 2004.

FIELD OF THE INVENTION

The present invention is directed to a method for preparation of polyolefins containing exo-olefin chain ends. The method involves quenching a cationic quasi-living polyolefin polymer system with one or more hindered secondary or tertiary amines.

BACKGROUND OF THE INVENTION

Linear polyolefins made using a mono-functional initiator containing a single "exo-olefin", "di-substituted" olefin, or "methyl vinylidene group," end group are useful precursors for the preparation of polymers containing specific functional end groups. Polymers made using multi-functional initiators would have multiple exo-olefinic end groups. Polymers containing specific end groups are useful as lubricating oil additives. One example of a functionalized polymer containing hetero atoms is polyisobutenylsuccinic anhydride. Functional end groups may also be desirable for making polymers with potential for further reactions.

Conventional ionic polymerizations can be anionic or cationic. Anionic polymerizations proceed, in the presence of a base, through carbanions and favor monomers having electron withdrawing groups. Cationic polymerizations proceed, in the presence of an acid, through a carbocation, also called a carbenium ion, and favor monomers that have electron releasing groups.

Similarly to the conventional polymerization systems, living polymerization systems may be either anionic or cationic. The difference between conventional polymerizations and living polymerizations is that an ideal living polymerization proceeds in the absence of chain transfer and chain termination. Living polymerization systems are of great commercial importance because the degree of polymerization may be controlled by controlling the feed ratio of monomer to initiator and sequential addition of two or more different monomers affords the ability to produce block copolymers. Polymerization continues until the monomer is exhausted, but the polymers retain their ability to add additional monomers any time in the future. A number of such systems are well known in the art.

A further development is the cationic quasi-living polymerization systems using conventional monomers. Quasi-living polymerization requires certain restrictive conditions, for example anhydrous reagents. Cationic quasi-living polymerizations differ from truly living polymerizations in that, although the rate of chain transfer approaches zero, chain termination is present but reversible. One important example of a cationic quasi-living polymerization is the cationic quasi-living polymerization of isobutylene.

Typically, cationic quasi-living polymerizations of isobutylene yield narrow molecular weight distribution and one major polymer product containing the 2-chloro-2-methylpropyl end group, also referred to as the "tert-chloride" end group. Under certain conditions minor amounts of olefinic isomers may also be produced.

On the other hand, there are two major olefinic isomers produced during conventional polymerization of isobutylene with $BF_3$, for example, the highly reactive exo-olefin isomer and the relatively unreactive 2-methyl-1-propenyl isomer, also referred to as the "tri-substituted" isomer or "endo olefin" isomer. Furthermore, conventional polymerizations of isobutylene yield polymers with broad molecular weight distributions or polydispersity indices.

Exclusive production of the exo-olefin isomer has not been previously achieved under conventional polymerization conditions for isobutylene.

There are two established methods for producing polyisobutylene containing only the exo-olefin end group. One method involves chemical dehydrohalogenation of tert-chloride terminated polyisobutylene using potassium tert-butoxide in a post polymerization reaction (U.S. Pat. No. 4,342,849). The other method involves in situ quenching of quasi-living isobutylene with methallyltrimethylsilane, which converts an active, living carbenium ion to the exo-olefin end group. (M. Roth and H. Mayr, *Macromolecules*, 29, 6104, 1996)

Polyisobutylene polymers containing more than one exo-olefin end group may be prepared using the above methods by the use of a multi-functional initiator.

The preparation of polyolefins, including polyisobutylene polymers, is well known in the art. A number of patents have discussed processes for making polyisobutylene polymers containing exo-olefin end groups, but none using quenching a cationic quasi-living polymerization system with a hindered secondary or tertiary amine.

European Patent No. 341012 discloses a method for producing polymers with narrow molecular weight distribution, where the ratio of the weight average molecular weight, M(w), to the number average molecular weight, M(n), approaches 1.

U.S. Pat. No. 4,152,499 discloses isobutene polymers having a mean degree of polymerization from 10 to 100 and where the proportion of theoretically possible terminal double bonds is greater than in products prepared using aluminum trichloride. The patent also discloses the method of making the isobutene polymers using boron trifluoride as the initiator.

U.S. Pat. No. 4,342,849 discloses the synthesis of polyisobutylene carrying either unsaturation or hydroxyl groups at both ends, in the case of a linear polymer, or at all ends in the case of a star polymer. The method involves the steps of refluxing a solution of telechelic di-halogen polyisobutylene, adding a solution strong base such as potassium t-butoxide and stirring to form the telechelic di-olefin polyisobutylene.

U.S. Pat. No. 4,393,199 discloses a method for carrying out cationic polymerization with molecular weight control in which a pre-initiator and a catalyst effective for cationic polymerization are mixed with a monomer. The resulting living polymer is then treated as desired.

U.S. Pat. No. 4,758,631 discloses a method of preparing allyl-terminated polyisobutylene by allylation with allyltrimethylsilane of tertiary chloro-capped polyisobutylene by electrophilic substitution. The synthesis begins with the boron trichloride catalyzed mono- or oligo-tertiary chloride "inifer" initiated polymerization of isobutylene, followed in the same reaction vessel by the addition of hexane, allyltrimethylsilane and titanium tetrachloride.

U.S. Pat. Nos. 4,910,321 and 5,122,572 disclose a catalyst composed of a complex of an organic acid or its ester and a Lewis acid, preferably boron trichloride that can add olefin monomers to increase the molecular weight of the complex from as low as 200 to in excess of a million. The patents also disclose polymers of different molecular weights having useful end groups such as halogens and specifically chloride, allyl, acryl or methacryl, acetate or formate.

U.S. Pat. Nos. 4,929,683 and 5,066,730 disclose a catalyst composed of a complex of an organic ether and a Lewis acid, preferably boron trichloride that can add olefin monomers to increase the molecular weight of the complex from as low as 200 to in excess of a million. The patents also disclose polymers of different molecular weights having useful end groups such as halogens and specifically chloride, allyl, acryl or methacryl, acetate or formate.

U.S. Pat. No. 5,219,948 discloses a method for preparing elastomeric polymers comprising alpha-olefins or conjugated alkadienes by cationic polymerization in the presence of titanium tetrachloride and an electron pair donor selected from pyridine or a non-hindered alkylpyridine. The polymers have very narrow, mono-modal molecular weight distribution.

U.S. Pat. No. 5,336,745 discloses a method for the direct synthesis of polymeric materials functionalized with desirable nitrogen-containing functional groups such as terminal azido, cyano, carbonylamino or thiocarbonylamino groups. Polymerization and functionalization occur in a substantially simultaneous manner.

U.S. Pat. No. 5,428,111 discloses a process for the living polymerization of aromatic, preferably styrenic monomers initiated from a living polyolefin, particularly polyisobutylene, chain end for making block copolymers having polyolefin mid-blocks and styrenic end-blocks.

U.S. Pat. No. 5,448,000 discloses a one-pot method of preparing sulfonic acid-terminated polyisobutylene by sulfonation with acetyl sulfate of a living polyisobutylene in a single step. The method involves "inifer" initiated carbocationic polymerization with Lewis acid to form the polymer followed by the sulfonation.

U.S. Pat. Nos. 5,637,647 and 5,677,386 disclose the capping of a living polymer with one or more capping compounds comprising non-polymerizable monomer selected from a group consisting of substituted or unsubstituted diphenyl alkylene, methoxystyrene, trans-stilbene, 1-isopropenyl-naphthalene and 2,4-dimethyl styrene.

U.S. patent application Ser. No. 10/433,439, Publication No. 2004/0015029 A1, discloses a process for the preparation of polyisobutylenes in which at least 60 percent of the polymer chains have at least one olefinically unsaturated terminal group, by cationic polymerization of isobutene or isobutene-containing monomer mixtures in the condensed phase and in the presence of an initiator system.

U.S. patent application Ser. No. 10/600,898, Publication No. 2004/0260033 A1, discloses the method for manufacturing and producing monodisperse telechelic polymers through cationic polymerization of suitable monomer under living polymerization conditions and quenching the polymerization with an N-substituted pyrrole. The functionalized polymers containing N-substituted pyrroles may be employed as fuel additives and/or lubricating oil additives.

PCT International Application No. PCT/EP/05472, International Publication No. WO99/09074, discloses a process for functionalizing polymers prepared by cationic polymerization wherein a living carbocationic polymerization system is reacted with one or more aromatic ring systems, and the use of substituted or unsubstituted reaction products of said process in lubricating oil or fuel compositions and additive concentrates, for example as dispersants, detergents or antioxidant additives or VI improvers.

β-*Proton elimination by Free Bases in the Living cationic Polymerization of Isobutylene,* by Young Cheol Bae and Rudolf Faust, Macromolecules, Volume 30, 7341-7344 (1997). The authors investigated β-proton elimination from quasi-living polyisobutylene, after observing exo-olefin formation in the presence of 2,6-di-tert-butylpyridine (DTBP) of low purity. They ascribed elimination to the presence of a sterically hindered cyclic imine base present in the DTBP in a concentration of $6 \times 10^{-6}$ moles per liter. They simulated this impurity using 2-tert-butylpyridine (TBP) and discovered that the latter, when added to the reactor at the start of the polymerization (i.e., in the presence of monomer) resulted in about 65 percent elimination after 3 hours of reaction time to produce exclusively exo-olefin. When the extent of elimination had reached 20 percent or higher, significant coupling was observed from both $^1$H NMR and GPC analyses. Bae and Faust clearly considered that elimination by sterically hindered bases, such as TBP, was undesirable and should be avoided. The first paragraph of the paper was summarized as follows: "Finally, strong bases may also eliminate β-protons, which should be avoided." Later, they refer to the cyclic imine base impurity in DTBP as "the culprit." Finally, they summarized the entire paper by saying that the elimination process should be avoided for polymer preparation purposes, although it might facilitate the measurement of kinetic rate constants: "While β-proton elimination should be avoided for the synthesis of well-defined macromolecules, if diffusion control of this process can be shown, it may provide a novel method of establishing the concentration of active centers, from which absolute propagation rate constants could be calculated."

SUMMARY OF THE INVENTION

The present invention is directed to a method for the preparation of polyolefins containing exo-olefin chain ends. The method involves quenching a cationic quasi-living polyolefin polymer system with one or more hindered secondary or tertiary amines. The method also involves use of Lewis acid and an electron donor, or a common ion salt or its precursor to form the cationic quasi-living polyolefin polymer to which is added the quenching agent to form the polymer product.

More specifically, the present invention is directed to a method for preparing a polyolefin containing one or more exo-olefinic end groups on the polymer chain, comprising quenching a cationic quasi-living polyolefin polymer system with one or more hindered secondary or tertiary amines containing only carbon, hydrogen, and nitrogen atoms, provided the hindered secondary or tertiary amines are not:

(a) Triethylamine;
(b) Tri-n-butylamine;
(c) Trihexylamine;
(d) Triisooctylamine;
(e) 2-phenylpyridine;
(f) 2,3-cyclododenopyridine;
(g) Di-p-tolylamine;
(h) Quinaldine; and
(i) 1-pyrrolidino-1-cyclopentene.

Preferably the quenching is carried out at a temperature in the range of from about −130° C. to about 10° C. More preferably the quenching is carried out at a temperature of about −80° C. to about 0° C., even more preferably the quenching is carried out at a temperature of about −70° C. to about −10° C., and most preferably the quenching is carried out at a temperature in the range of from about −60° C. to about −20° C.

Preferably the polyolefin is polyisobutylene.

In a further embodiment of the present invention the polyolefin is prepared in situ.

The hindered secondary or tertiary amine may be a linear secondary or tertiary amine, a cyclic secondary or tertiary amine or an aromatic secondary or tertiary amine.

In a preferred embodiment of the present invention the quenching agent is a hindered secondary or tertiary amine having the general formula:

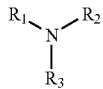

wherein $R_1$, $R_2$ and $R_3$ are independently hydrogen, alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or at least one of $R_1$ and $R_2$, $R_2$ and $R_3$ and $R_3$ and $R_1$, taken in pairs, independently form a fused aliphatic ring of from about 4 carbon atoms to about 8 carbon atoms;

provided that no more than one of $R_1$, $R_2$ and $R_3$ is hydrogen, and provided that $R_1$, $R_2$, and $R_3$ are not all linear alkyl of about 3 carbons or less.

In the above method the hindered amine is a tertiary or secondary amine having the general formula:

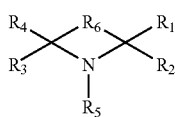

wherein $R_6$ is a divalent hydrocarbyl group of one carbon atom to about 4 carbon atoms each of which may be substituted with an alkyl group having one carbon atom to about 6 carbon atoms, and $R_1$, $R_2$, $R_3$, $R_4$, and $R_5$ are independently hydrogen, alkyl containing one carbon atom to about 20 carbon atoms, cycloalkyl of about 3 to about 8 carbon atoms, aryl of about 6 to about 30 carbon atoms, alkaryl of 7 to 30 carbon atoms, or aralkyl of 7 to 30 carbon atoms; provided if $R_1$, $R_2$, $R_3$, and $R_4$ are hydrogen, then $R_5$ is a branched alkyl from about 4 to about 20 carbon atoms, aryl of about 6 to about 30 carbon atoms, or aralkyl of about 7 to about 30 carbon atoms, and provided if $R_5$ is hydrogen, then $R_1$, $R_2$, $R_3$, and $R_4$ are not hydrogen, unless one of $R_1$ or $R_2$ and one of $R_3$ or $R_4$ is a branched alkyl having from about 4 to about 20 carbon atoms.

In a particularly preferred embodiment of the above method the hindered amine is a secondary or tertiary amine of the formula:

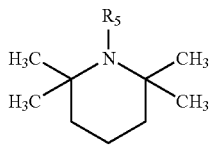

wherein $R_5$ is hydrogen or methyl.

In another preferred embodiment of the above method the hindered secondary or tertiary amine has the general formula:

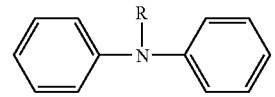

wherein R is hydrogen or alkyl containing one carbon atom to about 20 carbon atoms or an aromatic or an aliphatic ring having about 3 carbon atoms to about 7 carbon atoms.

In a particularly preferred embodiment of the above method the hindered amine is a tertiary amine of the formula:

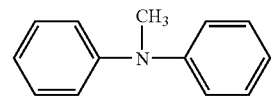

In a further preferred embodiment of the above method the hindered amine is a secondary amine of the formula:

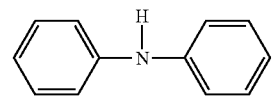

In another preferred embodiment of the above method the hindered amine is a tertiary amine of the formula:

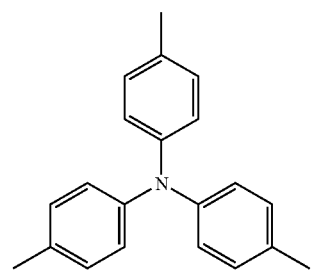

In yet another preferred embodiment of the above method the hindered amine is a tertiary amine of the formula:

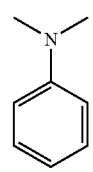

The hindered secondary or tertiary amine in another embodiment of the method of the present invention has the general formula:

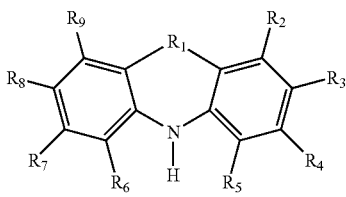

wherein $R_1$ is a divalent hydrocarbyl group of one carbon atom to about 4 carbons and $R_2$, $R_3$, $R_4$, $R_7$, $R_8$, and $R_9$ are independently hydrogen, alkyl containing one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, and one of $R_5$ and $R_6$ is hydrogen and the other is linear alkyl from one carbon atom to about 20 carbon atoms.

In a preferred embodiment of the above method where in one of $R_5$ and $R_6$ is hydrogen.

In an embodiment of the above method the amine has the formula:

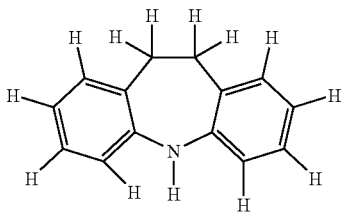

In yet another embodiment of the method of the present invention the hindered amine is a tertiary amine of the general formula:

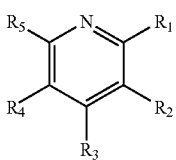

wherein one of $R_1$ and $R_5$ is hydrogen and the other is a branched alkyl of about 3 to about 20 carbon atoms, aryl of about 10 to about 30 carbon atoms, or aralkyl of about 11 to about 30 carbon atoms; $R_2$, $R_3$ and $R_4$ are independently hydrogen, alkyl of one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or at least one of $R_1$ and $R_2$, $R_2$ and $R_3$, $R_3$ and $R_4$, and $R_4$ and $R_5$, taken in pairs, independently form a fused aromatic ring of from 5 carbon atoms to 7 carbon atoms or aliphatic ring of from about 4 carbon atoms to about 8 carbon atoms, provided that if $R_1$ and $R_2$ form a fused aliphatic or aromatic ring, then $R_5$ is a branched alkyl of about 3 to about 20 carbon atoms, aryl of about 10 to about 30 carbon atoms, or aralkyl of about 11 to about 30 carbon atoms, and provided that if $R_4$ and $R_5$ form a fused aliphatic or aromatic ring, then $R_1$ is a branched alkyl of about 3 to about 20 carbon atoms, aryl of about 10 to about 30 carbon atoms, or aralkyl of about 11 to about 30 carbon atoms.

In a further embodiment of the above method $R_1$, $R_2$, $R_3$ and $R_4$ are hydrogen and $R_5$ is tert-butyl.

In another embodiment of the method of the present invention the hindered amine is nitrogen containing hetero-aromatic ring having the following formulas, (a), (b) and (c):

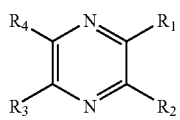

(a)

wherein in formula (a)

one of $R_1$ and $R_4$ is hydrogen and the other is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, one of $R_2$ and $R_3$ is hydrogen and the other is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms; or at least one of $R_1$ and $R_2$ and $R_3$ and $R_4$, taken in pairs, independently form a fused aromatic ring of from 5 carbon atoms to 7 carbon atoms or aliphatic ring of from about 4 carbon atoms to about 8 carbon atoms;

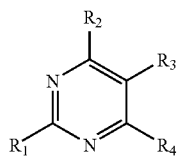

(b)

wherein in formula (b)

$R_1$, $R_2$ and $R_4$ are independently hydrogen or alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, $R_3$ is hydrogen, alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms; or at least one of $R_2$ and $R_3$ or $R_3$ and $R_4$, taken in pairs, independently form a fused aromatic ring of from 5 carbon atoms to 7 carbon atoms or aliphatic ring of from about 4 carbon atoms to about 8 carbon atoms, provided that if $R_1$ is hydrogen then $R_2$ and $R_4$ are independently alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, and further provided that if $R_2$ or $R_4$ is hydrogen, then $R_1$ is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms;

and

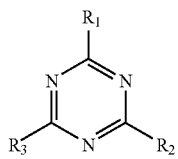

wherein in formula (c)
$R_1$, $R_2$ and $R_3$ are independently hydrogen or alkyl of one carbon to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms.

In a preferred embodiment of the above method the hindered amine has the formula:

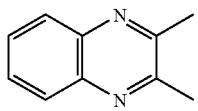

In a further embodiment of the above method the hindered amine has the formula:

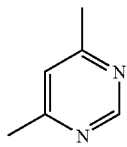

In yet another preferred embodiment of the above method the hindered amine has the formula:

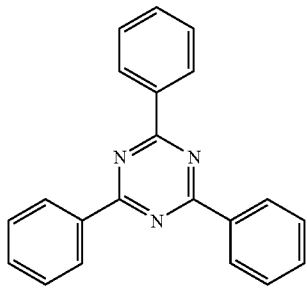

In the method of the present invention the polyolefin is prepared by quenching a quasi-living polyolefin polymer product containing terminal tert-chloride chain ends or a mixture comprising terminal olefinic chain ends and terminal tert-chloride chain ends with a hindered secondary or tertiary amine in the presence of a Lewis acid.

In yet another embodiment of the present invention the polyolefin is prepared by quenching a quasi-living polyolefin polymer product containing terminal tert-chloride chain ends with a hindered secondary or tertiary amine in the presence of a Lewis acid.

Preferably the Lewis acid is a halide of titanium or boron. More preferably the Lewis acid is a titanium halide. Most preferably Lewis acid is titanium tetrachloride. Preferably the concentration of the titanium tetrachloride exceeds 2 times the combined concentrations of protic impurities, electron donor, common ion salt or its precursor, and the quenching agent or quenching agents.

The polyolefin product obtained using the method of the present invention has exo-olefin chain ends in the range of one percent to 100 percent based on the total chain ends. Preferably the polyolefin product has at least 3 percent exo-olefin chain ends, more preferably at least 20 percent exo-olefin chain ends, even more preferably at least 50 percent exo-olefin chain ends, still more preferably at least 70 percent exo-olefin chain ends, and still more preferably 90 percent exo-olefin chain ends. Most preferably the polyolefin product has at least 99 percent exo-olefin chain ends based on the total chain ends.

In the method of the present invention the quasi-living polyolefin polymer is formed by contacting at least one cationically polymerizable monomer with an initiator, in the presence of a Lewis acid under reaction conditions suitable for quasi-living polymerization. Preferably the at least one cationically polymerizable monomer comprises at least one of isobutylene, 2-methyl-1-butene, 3-methyl-1-butene, 4-methyl-1-pentene, and beta-pinene. More preferably the at least one cationically polymerizable monomer is isobutylene.

In the method of the present invention two or more different cationically polymerizable monomers may be employed.

In the method of the present invention the initiator may be mono-functional or multi-functional. Preferably the initiator is mono-functional or di-functional. More preferably the initiator is mono-functional.

In the method of the present invention the mono-functional initiator comprises at least one of 2-chloro-2-phenylpropane; 2-acetyl-2-phenylpropane; 2-propionyl-2-phenylpropane, 2-methoxy-2-phenylpropane, 2-ethoxy-2-phenylpropane, 2-chloro-2,4,4-trimethylpentane, 2-acetoxy-2,4,4,-trimethylpentane, 2-propionoxy-2,4,4-trimethylpentane, 2-methoxy-2,4,4-trimethylpentane, and 2-ethoxy-2,4,4-trimethylpentane.

In the method of the present invention the di-functional initiators include 1,3-di(2-chloro-2-propyl)-5-tert-butylbenzene, 1,4-di(2-chloro-2-propyl)benzene, 1,4-di(2-acetoxy-2-propyl)benzene, 1,3-di(2-acetoxy-2-propyl)-5-tert-butylbenzene, 1,3-di(2-methoxy-2-propyl)-5-tert-butylbenzene and 1,4-di(2-methoxy-2-propyl)benzene.

In the method of the present invention an example of a multi-functional initiator is 1,3,5-tri(2-chloro-2-propyl)-benzene.

In the method of the present invention the molecular weight distribution, $M_w/M_n$, of the polyolefin polymer is present in the range of about 1.01 to about 3.0. Preferably the molecular weight distribution, $M_w/M_n$, of the polyolefin polymer is present in the range of about 1.1 to about 2.0. More preferably the molecular weight distribution, $M_w/M_n$, of the polyolefin polymer is less than 1.5.

The present invention is also directed to a further method for preparing a polyolefin containing one or more exo-olefinic end groups on the polymer chain, comprising quenching a cationic quasi-living polyolefin polymer system with one or more hindered secondary or tertiary amines containing only carbon, hydrogen and nitrogen atoms, wherein the hindered secondary or tertiary amine compounds are pre-reacted with a Lewis acid, and provided the hindered secondary or tertiary amines are not:
(a) Triethylamine;
(b) Tri-n-butylamine;
(c) Trihexylamine;

(d) Triisooctylamine;
(e) 2-phenylpyridine;
(f) 2,3-cyclododenopyridine;
(g) Di-p-tolylamine;
(h) Quinaldine; and
(i) 1-pyrrolidino-1-cyclopentene.

In a preferred embodiment of the above method the Lewis acid is titanium tetrachloride.

In a yet more preferred embodiment of the above method the Lewis acid is titanium tetrachloride and the hindered amine is 1,2,2,6,6-pentamethylpiperidine.

In another preferred embodiment of the above method the Lewis acid is titanium tetrachloride and the hindered amine is 2,2,6,6-tetramethylpiperidine.

DETAILED DESCRIPTION OF THE INVENTION

Definitions

As used herein, the following terms have the following meanings unless expressly stated to the contrary:

The term "alkyl" as used herein refers to straight chain and branched chain saturated aliphatic groups typically having from one carbon atom to about 20 carbons atoms. Some examples of straight chain and branched chain saturated aliphatic groups are methyl, ethyl, propyl, butyl, isopropyl, isobutyl, sec-butyl, tert-butyl, and the like.

The term "aromatic or aliphatic fused ring" as used herein refers to the ring formed by two adjacent carbon atoms on a ring and the formed ring is fused to the ring.

The term "branched alkyl" as used herein refers to an alkyl group in which the carbon atom representing the point of attachment of the group to the rest of the molecule is either a tertiary or quaternary carbon atom. The term "tertiary carbon" as used herein refers to a carbon atom that is attached to three other carbon atoms. The term "quaternary carbon" as used herein refers to a carbon atom that is attached to 4 other carbon atoms.

The terms "carbenium ion" or "carbocation" as used herein refer to a positively charged carbon atom bearing three sp²-bonded substituents and an empty p orbital.

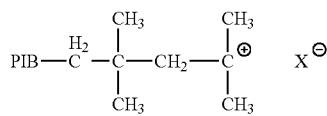

PIB Carbenium Ion

The term "chain transfer" as used herein refers to the cessation of growth of one polymerization chain with the possible initiation of another polymerization chain.

The term "common ion salt" as used herein refers to an ionic salt that is optionally added to a quasi-living cationic polymerization mixture to prevent dissociation of the propagating carbenium ion and counter-ion pairs. The anion of the common ion salt is identical to the counter-ions of the propagating chain ends. The cation of the common ion salt is typically a fatty quaternary ammonium cation, such as tetra-n-butyl ammonium ion, which confers solubility in the organic media.

The term "common ion salt precursor" as used herein refers to an ionic salt, optionally added to a quasi-living cationic polymerization mixture, which generates counter-anions that are identical to those of the propagating chain ends, via in situ reaction with the Lewis acid. An example is tetra-n-butylammonium chloride.

The term "controlled molecular weight distribution" as used herein refers to polyolefin polymers having a desired molecular weight distribution. The molecular weight distribution or polydispersity index (PDI) herein is calculated by dividing the average molecular weight of the polymer chains by the number average molecular weight, $M_w/M_n$.

The term "coupled product" as used herein refers to the product of addition of a PIB terminal carbenium ion to a PIB exo-olefin chain end. Coupled product has a number average molecular weight that is approximately twice that of the main polymer product.

The term "coupling" as used herein refers to the addition of a polyisobutylene terminal carbenium ion to a polyisobutylene exo-olefin chain end.

The term "conventional polymerization" as used herein refers to polymerization wherein the chain-reaction polymerization involving olefins proceeds with ions as chain carrying particles, either anions or cations. Polymerization proceeds through the steps of chain initiation, chain propogation, chain transfer and chain termination.

The term "di-EAS product" as used herein refers to the product which results when two separate polyisobutylene terminal carbenium ions react to form a covalent bond with a single quenching agent molecule. Di-EAS product contains in its structure a residue from the quenching agent.

The terms "di-substituted olefin" or "exo-olefin" or "methyl vinylidene" as used herein refer to an olefin polymer chain containing an exo-olefin chain end as shown below.

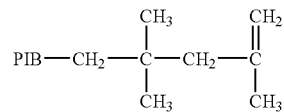

The term "di-valent hydrocarbyl" as used herein refers to a hydrocarbyl group which possesses two points pf attachment to the rest of the molecule.

The term "EAS product" as used herein refers to the product which results when one polyisobutylene terminal carbenium ion reacts to form a covalent bond with a single quenching agent molecule. EAS product contains in its structure a residue from the quenching agent.

The term "electron donor" as used herein refers to a basic and/or nucleophilic substance added to the polymerization reaction that is either fully complexed with the Lewis acid or fully non-complexed with the Lewis acid. The concentration of electron donor exceeds the concentration of the protic impurities, for example water.

The term "electrophilic aromatic substitution or EAS" as used herein refers to the process by which the EAS product is produced.

The term "gem-dimethyl carbons" as used herein refers to the two methyl carbons alpha to the carbenium ion or the chloride bonded carbon of the polyolefin polymer chain end as depicted in the structure below.

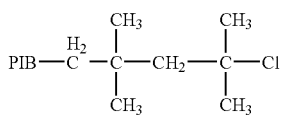

PIB tert-Chloride

The term "hydrocarbyl" refers to an organic radical primarily composed of carbon and hydrogen which may be aliphatic, alicyclic, aromatic or combinations thereof, e.g., aralkyl or alkaryl. Such hydrocarbyl groups may also contain aliphatic unsaturation, i.e., olefinic or acetylenic unsaturation, and may contain minor amounts of heteroatoms, such as oxygen or nitrogen, or halogens, such as chlorine.

The term "initiator" as used herein refers to the chemical moiety that starts the polymerization and satisfies the valence at the head of the polymer chain, or the molecule that provides that moiety. When a mono-functional initiator is used, the chain end (CE) concentration equals the initiator concentration. For a multi-functional initiator, when the functionality of the initiator equals x, then the chain end concentration equals x times initiator concentration.

The term "hindered secondary or tertiary amine" as used herein refers to a compound that is appropriately substituted such that it is sufficiently sterically hindered to be not fully complexed with the Lewis acid, yet sufficiently sterically hindered to allow its reaction with the carbenium ion. Preferably the hindered amine is a tertiary amine.

The term "Lewis acid" as used herein refers to a compound that can accept a pair of electrons to form a covalent bond.

The term "living polymerization" as used herein refers to the polymerizations that proceed in the absence of measurable chain transfer and chain termination.

The term "quasi-living polymerization" as used herein refers to living polymerizations wherein reversible chain terminations is operable, but irreversible chain termination and chain transfer approaches zero.

The term "quenching agent" as used herein refers to a chemical compound which is added to the polymerization reactions to react with the growing chain end.

The term "polyolefin" as used herein refers to a polymer produced by the addition polymerization of one or more olefins, such as ethylene, propylene, styrene, isobutylene, etc.

The term "protic impurity" as used herein refers to impurities within the polymerization reaction mixture that contain acidic hydrogen atoms in their structure, for example, water.

The term "regiospecific" as used herein refers to chemical reactions that give exclusively or nearly exclusively one of several possible isomeric products.

The term "termination" as used herein refers to the chemical reaction that terminates polymerization process or the quenching reaction by destruction of the Lewis acid.

The term "terminator" as used herein refers to the chemical compound that terminates polymerization process or the quenching reaction, but may not simultaneously initiate a new polymer chain. A number of alcohols may be used as terminators.

The term "tert-chloride" refers to the 2-chloro-2-methyl-propyl end group on a polyolefin polymer chain.

Unless otherwise specified, all percentages are in weight percent.

It has been determined that sufficiently hindered secondary or tertiary amines, such as 1,2,2,6,6-pentamethyl piperidine and N-methyldiphenylamine, used as quenching agents in the preparation of polyolefin polymers of the present invention are capable of quantitatively converting polyolefin polymer endo-olefin chain ends and tert-chloride chain ends to the exo-olefin chain ends. Without being bound by any theory it is believed that these quenching agents selectively catalyze the elimination of a proton exclusively from the gem-dimethyl carbon of the polyisobutylene chain end as shown below.

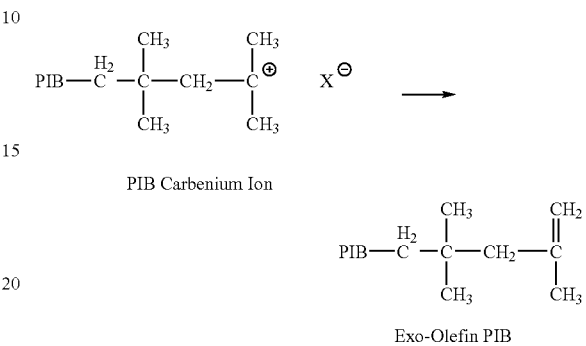

PIB Carbenium Ion

Exo-Olefin PIB

The quenching agents used in the present invention are able to quantitatively convert polyolefin polymer containing endo-olefin chain ends and tert-chloride chain ends to the exo-olefin chain ends independently of whether a mono-functional initiator is used or a multi-functional. Furthermore, the rate of conversion is the same for mono-functional and di-functional initiators. A 100 percent conversion was observed within 15 minutes after addition of the mono-functional initiator, 2-chloro-2,4,4-trimethyl pentane.

General Procedure for Preparation of Polyolefin Polymers Containing a High Percentage of Exo-Olefin End Groups on the Chain A typical procedure for the preparation of polyolefin polymers of the present invention is given below:

The method of the present invention may be conducted as a batch process, a continuous process, a semi-batch process or by any process known by persons skilled in the art.

The polymerization reaction is carried out under inert gas and in a substantially anhydrous environment. The reactor is charged with the following reactants:

1. a diluent,
2. an initiator,
3. an electron donor or common ion salt or its precursor,
4. one or more monomers, and
5. a Lewis acid, which typically comprises a halide of titanium or boron;

The reaction mixture is equilibrated at the desired temperature, ranging from above −130° C. to about 10° C. The method of the present invention may be carried out at any desired pressure, atmospheric, sub-atmospheric or super-atmospheric pressure.

The progress of the polymerization reaction is monitored in situ by determination of the amount of monomer remaining in the reaction mixture. After high conversion of the monomer is observed, an aliquot is removed for determination of the pre-quench chain end composition before addition of the quenching agent. The polymerization reaction in the aliquot is terminated with an appropriate alcohol equilibrated at the desired temperature.

6. A hindered secondary or tertiary amine is added to the reaction mixture to quench the polymerization reaction.

Although, the concentration of the reactants may be varied to obtain the desired product, it has been found that certain ratios of the reactants are important for obtaining high exo-olefin chain end yield. The ratios are described below:

The molar ratio of monomer to initiator is in the range from about 3:1 to about 20,000:1. Preferably the molar ratio of monomer to initiator is in the range of about 5:1 to about 2,000:1. More preferably the molar ratio of monomer to initiator is about 10:1 to 150:1. The mole ratio of monomer to initiator controls the final molecular weight of the polyolefin.

The molar ratio of Lewis acid to chain ends is in the range from about 0.1:1 to about 2,500:1. Preferably the molar ratio of Lewis acid to chain ends is in the range of about 2:1 to about 200:1. More preferably the molar ratio of Lewis acid to chain ends is about 2:1 to 15:1.

The molar ratio of Lewis acid to electron donor is in the range from about 1.1:1 to about 10,000:1. Preferably the molar ratio of Lewis acid to electron donor is in the range of about 2:1 to about 100:1. More preferably the molar ratio of Lewis acid to electron donor is about 4:1 to 30:1.

The molar ratio of Lewis acid to quenching agent is in the range from about 1.1:1 to about 2,500:1. Preferably the molar ratio of Lewis acid to quenching agent is in the range of about 2:1 to about 100:1. More preferably the molar ratio of Lewis acid to quenching agent is about 2:1 to 15:1.

The molar ratio of quenching agent to chain ends is in the range from about 0.25:1 to about 20:1. Preferably the molar ratio of quenching agent to chain end is in the range of about 0.5:1 to about 5:1. More preferably the molar ratio of quenching agent to chain end is about 0.5:1 to 4:1.

Additional aliquots are removed from the reaction mixture at various time intervals after addition of the quenching agent to determine the concentration of the exo-olefin chain ends on the polyolefin polymers. The polymerization reaction is terminated in all the aliquot samples and the remaining reaction mixture with an appropriate alcohol equilibrated at the desired temperature.

The concentration of the exo-olefin chain ends, along with the concentration of the endo-olefin and tert-chloride chain ends, is quantified using $^1$H NMR. GPC spectra are also obtained to qualitatively determine the amount of coupled product.

Compounds suitable for use in the preparation of the polyolefin polymers of the present invention are given below:

Diluents

Diluents influence the ionization equilibria and rates of exchange of growing species through their polarity, which can be estimated from their dielectric constants. Typically, solvents having low dielectric constants are preferred since ion pairs are less dissociated. Suitable solvents include, but are not limited to, low-boiling alkanes and alkyl mono or polyhalides with reasonably low freezing points to be used at the preferred polymerization temperature. Illustrative solvents include alkanes (generally $C_2$ to $C_{10}$ alkanes, including normal alkanes such as propane, normal butane, normal pentane, normal hexane, normal heptane, normal octane, normal nonane and normal decane, and branched alkanes including isobutane, isopentane, isohexane, 3-methylpentane, 2,2-dimethylbutane, 2,3-dimethylbutane and the like), alkenes and alkenyl halides (such as vinyl chloride), carbon disulfide, chloroform, ethylchloride, N-butyl chloride, methylene chloride, methyl chloride, 1,2-dichloroethane, 1,1,2,2-tetrachloroethane, sulfur dioxide, acetic anhydride, carbon tetrachloride, acetonitrile, neopentane, benzene, toluene, methylcyclohexane, chlorobenzene, 1,1-dichloroethane, 1,1-dichloroethene, 1,2-dichloroethene, n-propyl chloride, iso-propyl chloride, 1,2-dichloropropane, or 1,3-dichloropropane, nitro-alkanes (such as nitropropane) to name a few of the representative liquid diluents or solvents useful in cationic polymerizations. Mixed solvents (for example combinations of those listed above) can also be used.

Initiators

Initiator compounds for living and quasi-living carbocationic polymerization are well known in the art. Initiators may be mono-functional or multi-functional depending on the desired product. Mono-functional and di-functional initiators are employed when the desired polymer is to be linear. For making star polymers the initiator should have more than two reactive moieties. The contemplated initiator compounds can be represented by the general formula $(X'—CR_aR_b)_nR_c$ wherein $R_a$, $R_b$ and $R_c$ are independently comprises at least one of alkyl, aromatic, alkyl aromatic groups, and can be the same or different, and X' is an acetate, etherate, hydroxyl group, or a halogen. $R_c$ has a valance of n, and n is an integer of one to 4. Preferably $R_a$, $R_b$, and $R_c$ are hydrocarbon groups containing one carbon atom to about 20 carbon atoms, preferably one carbon atom to about 8 carbons atoms. Preferably X' is a halogen and more preferably chloride. In some instances it is preferable to select the structure of $R_a$, $R_b$ and $R_c$ to mimic the growing species or monomer, e.g. a 1-phenylethyl derivative for polystyrene or 2,4,4-trimethyl pentyl derivative for polyisobutene. Suitable compounds, include for example, cumyl, dicumyl and tricumyl halides, particularly the chlorides, i.e., 2-chloro-2-phenylpropane, i.e., cumyl chloride; 1,4-di(2-chloro-2-propyl)benzene, i.e., di(cumylchloride); 1,3,5-tri(2-chloro-2-propyl)benzene, i.e., tri(cumylchloride); 2,4,4-trimethyl-2-chloropentane; 2-acetoxy-2-phenylpropane, i.e., cumyl acetate; 2-propionoxy-2-phenyl propane, i.e., cumyl propionate; 2-methoxy-2-phenylpropane, i.e., cumylmethyl ether; 1,4-di(2-methoxy-2-propyl)benzene, i.e., di(cumylmethyl ether); 1,3,5-tri(2-methoxy-2-propyl)benzene, i.e., tri(cumylmethyl ether), and similar compounds. Other suitable examples can be found in U.S. Pat. No. 4,946,899. Particularly preferred examples are 2-chloro-2,4,4-trimethyl pentane (TMPCl), 1,3,5 tri(2-chloro-2-propyl)benzene, and 1,3,-di(2-chloro-2-propyl)-5-tert-butylbenzene (bDCC), 1,3-di(2-acetoxy-2-propyl)-5-tert-butylbenzene, 1,3-di(2-methoxy-2-propyl)-5-tert-butylbenzene and 1,4-di(2-methoxy-2-propyl)benzene.

The concentration of the chain ends in the total reaction mixture may be in the range from about 0.0001 moles per liter to about 2.0 moles per liter. Preferably the concentration of the chain ends is in the range from about 0.001 moles per liter to about 1.0 moles per liter. More preferably the concentration of the chain ends is in the range from about 0.005 moles per liter to about 0.5 moles per liter.

Electron Donors

Electron Donors have been shown to convert traditional polymerization systems into living and/or quasi-living cationic polymerizations systems. The electron donor used in the present invention is not specifically limited to any particular compound or class of compounds. Examples include pyridines and alkyl amines, aprotic amides, sulfoxides, esters, metal compounds having an oxygen atom bonded to a metal atom, and others. Pyridine compounds include 2,6-di-tert-butylpyridine, 2,6-dimethylpyridine, 2,4-dimethylpryidine, 2,4,6-trimethylpyridine, 2-methylpyridine and pyridine. N,N-dimethylaniline and N,N-dimethyltoluidine may also be employed. Amide compounds include N,N-dimethylformamide, N,N-dimethylacetamide and N,N-diethylacetamide. An example of a sulfoxide compound is dimethyl sulfoxide. Diethyl ether is an example of an ether compound, and methyl acetate and ethyl acetate are examples of ester compounds. Phosphate compounds such as trimethyl phosphate, tributyl phosphate, triamide hexamethylphosphate may also be employed. Oxygen-containing metal compounds such as tetraisopropyl titanate are also useful as electron donors.

The concentration of the electron donors in the total reaction mixture may be in the range from about 0.001 moles per liter to about 0.1 moles per liter. Preferably the concentration of the electron donors is in the range from about 0.001 moles per liter to about 0.05 moles per liter. More preferably the concentration of the electron donors is in the range from about 0.002 moles per liter to about 0.02 moles per liter.

Common Ion Salts and Common Ion Salt Precursors

Common ion salts or salt precursors may be optionally added to the reaction mixture in addition to or replacement of the electron donor. Typically, these salts are used to increase the ionic strength, suppress free ions, and beneficially interact with ligand exchange. Particularly preferred are common ion salt precursors, for example tetra-n-butylammonium chloride (n-Bu$_4$NCl).

The concentration of the common ion salts or salt precursors in the total reaction mixture may be in the range from about 0.0005 moles per liter to about 0.05 moles per liter. Preferably the concentration of the common ion salts or salt precursors is in the range from about 0.0005 moles per liter to about 0.025 moles per liter. More preferably the concentration of the common ion salt or salt precursors is in the range from about 0.001 moles per liter to about 0.007 moles per liter.

Monomers

Suitable monomers for use in the method of the present invention are hydrocarbon monomers, i.e., compounds containing only hydrogen and carbon atoms, especially olefins and diolefins, and normally those having from 2 to about 20 carbon atoms, but preferably from about 4 to about 8 carbon atoms. The process can be employed for the polymerization of such monomers to produce polymers of different, but uniform molecular weights, for example, from about 300 to in excess of a million g/mol. Such polymers can be low molecular weight liquid or viscous polymers having a molecular weight of from about 200 to 10,000 g/mol, or solid waxy to plastic, or elastomeric materials having molecular weights of from about a 100,000 to 1,000,000 g/mol, or more. Suitable monomers include such compounds as isobutylene, styrene, beta pinene, isoprene, butadiene, substituted compounds of the preceding types, and others. Particularly preferred monomers are isobutylene, 2-methyl-butene, 3-methyl-1-butene, 4-methyl-1-pentene, and beta-pinene. An even more preferred monomer is isobutylene. Mixtures of monomers may be used.

The concentration of the monomers in the total reaction mixture may be in the range from about 0.01 moles per liter to about 5.0 moles per liter. Preferably the concentration of the monomers is in the range from about 0.1 moles per liter to about 2.0 moles per liter. More preferably the concentration of the monomers is in the range from about 0.3 moles per liter to about 1.0 mole per liter. Most preferably the concentration of the monomers is 0.5 moles per liter.

Lewis Acids

Lewis acids that are suitable as catalysts for purposes of the invention include, but are not limited to, titanium and boron halides, particularly titanium tetrachloride and boron trichloride. Use of the titanium halides and particularly titanium tetrachloride is preferred. The strength of the Lewis acid and its concentration should be adjusted for the particular monomer. Additionally, the strength of these Lewis acids can be adjusted using nucleophilic additives. In some instances these Lewis acids are also referred to as co-initiators.

The amount of the Lewis acid present in the initiator system may vary. However, it is desirable that the concentration of Lewis acid is sufficient to achieve an appropriate rate of polymerization and quenching. The Lewis acid concentration should not be so high as to precipitate the formed polymer.

The concentration of the Lewis acid in the total reaction mixture may be in the range from about 0.001 moles per liter to about 3.0 moles per liter. Preferably the concentration of the Lewis acid is in the range from about 0.005 moles per liter to about 1.5 moles per liter. More preferably the concentration of the Lewis acid is in the range from about 0.05 moles per liter to about 1.0 mole per liter.

Quenching Agents

Quenching agents contemplated for use in preparation of the polyolefin in the present invention are hindered secondary or tertiary amine compounds, such as 2-tertbutyl pyridine, n-tributylamine, 1,2,2,6,6-pentamethyl piperidine and N-methyldiphenylamine.

The hindered secondary or tertiary amine employed as a quenching agent in the present invention has the general formula:

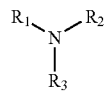

wherein $R_1$, $R_2$ and $R_3$ are independently hydrogen, alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or at least one of $R_1$ and $R_2$, $R_2$ and $R_3$ and $R_3$ and $R_1$, taken in pairs, independently form a fused aliphatic ring of from about 4 carbon atoms to about 8 carbon atoms;

provided that no more than one of $R_1$, $R_2$ and $R_3$ is hydrogen, and provided that $R_1$, $R_2$, and $R_3$ are not all linear alkyl of about 3 carbons or less.

In a preferred embodiment of the above method the hindered secondary or tertiary amine has the general formula:

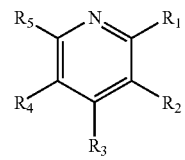

wherein one of $R_1$ and $R_5$ is hydrogen and the other is a branched alkyl of about 3 to about 20 carbon atoms, aryl of about 10 to about 30 carbon atoms, or aralkyl of about 11 to about 30 carbon atoms; $R_2$, $R_3$ and $R_4$ are independently hydrogen, alkyl of one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or at least one of $R_1$ and $R_2$, $R_2$ and $R_3$, $R_3$ and $R_4$, and $R_4$ and $R_5$, taken in pairs, independently form a fused aromatic ring of from 5 carbon atoms to 7 carbon atoms or aliphatic ring of from about 4 carbon atoms to about 8 carbon atoms, provided that if $R_1$ and $R_2$ form a fused aliphatic or aromatic ring, then $R_5$ is a branched alkyl of about 3 to about 20 carbon atoms, aryl of about 10 to about 30 carbon atoms, or aralkyl of about 11 to about 30 carbon atoms, and provided that if $R_4$ and $R_5$ form a fused aliphatic or aromatic ring, then $R_1$ is a branched alkyl of about 3 to about 20 carbon atoms, aryl of about 10 to about 30 carbon atoms, or aralkyl of about 11 to about 30 carbon atoms.

In a preferred embodiment in the above method $R_1$ is hydrogen and $R_5$ is tert-butyl and $R_2$, $R_3$ and $R_4$ are hydrogen.

The hindered amine employed in the method of the present invention may be a nitrogen containing hetero-aromatic ring having the following formulas, (a), (b) and (c):

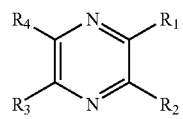
(a)

wherein in formula (a)

one of $R_1$ and $R_4$ is hydrogen and the other is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, one of $R_2$ and $R_3$ is hydrogen and the other is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms; or at least one of $R_1$ and $R_2$ and $R_3$ and $R_4$, taken in pairs, independently form a fused aromatic ring of from 5 carbon atoms to 7 carbon atoms or aliphatic ring of from about 4 carbon atoms to about 8 carbon atoms;

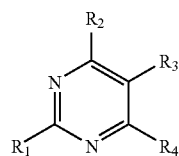
(b)

wherein in formula (b)

$R_1$, $R_2$ and $R_4$ are independently hydrogen or alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, $R_3$ is hydrogen, alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms; or at least one of $R_2$ and $R_3$ or $R_3$ and $R_4$, taken in pairs, independently form a fused aromatic ring of from 5 carbon atoms to 7 carbon atoms or aliphatic ring of from about 4 carbon atoms to about 8 carbon atoms, provided that if $R_1$ is hydrogen then $R_2$ and $R_4$ are independently alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, and further provided that if $R_2$ or $R_4$ is hydrogen, then $R_1$ is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms;

and

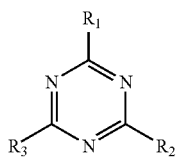
(c)

wherein in formula (c)

$R_1$, $R_2$ and $R_3$ are independently hydrogen or alkyl of one carbon to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms.

Structures of other hindered secondary or tertiary amines that may be employed in the method of the present invention are given below. The given structures are only intended as examples and in no way limit the scope of the present invention.

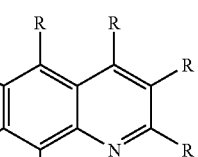
Quinoline

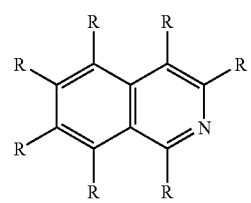
Isoquinoline

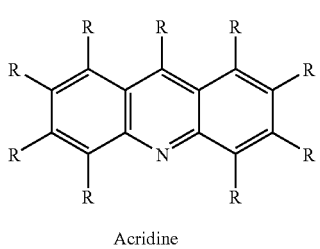
Acridine

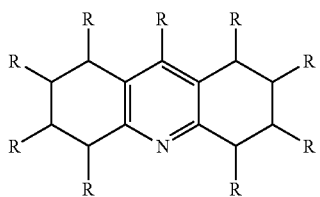
Pyrazine

-continued

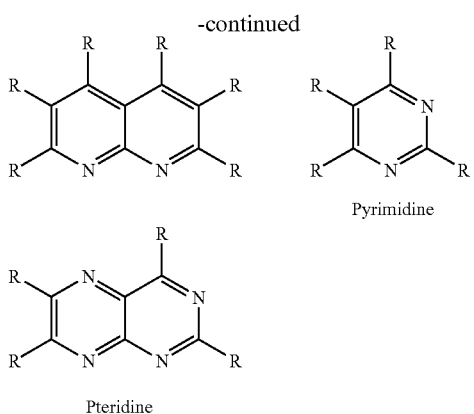

Pyrimidine

Pteridine

Structures of other hindered secondary or tertiary that may be employed in the method of the present invention may be obtained by substitution of the nitrogen atoms with phosphorus atoms. The given structures are only intended as examples and in no way limit the scope of the present invention.

The concentration of the quenching agent in the total reaction mixture may be in the range from about 0.0001 moles per liter to about 2.0 moles per liter. Preferably the concentration of the quenching agent is in the range from about 0.001 moles per liter to about 1.0 moles per liter. More preferably the concentration of the quenching agent is in the range from about 0.005 moles per liter to about 0.5 moles per liter.

Terminators

Any soluble alcohol may be used to terminate the polymerization reaction in the present invention. Preferred are monoalcohols containing from about one carbon atom to about 8 carbon atoms.

EXAMPLES

Example 1

Preparation of Polyisobutylene Using a Mono-Functional Initiator and 1,2,2,6,6-pentamethyl piperidine A four-neck 250 milliliter round-bottom flask, equipped with an overhead mechanical stirrer and platinum resistance thermometer, was fitted to the end of a ATR-FTIR probe which is connected an FTIR spectrometer via a light conduit as described in R. F. Storey; Q. A. Thomas, *Macromolecules*, 2003, 36, 5065-5071. This assembly was immersed into a heptane bath at −60° C. under dry nitrogen gas in a substantially inert atmosphere MBraun glovebox. An air background spectrum was acquired and subtracted from all subsequently collected spectra. The flask was then charged with the following reactants:
113 milliliters hexane equilibrated at −60° C.,
75.7 milliliters methylchloride equilibrated at −60° C.,
0.477 milliliters 2-chloro-2,4,4-trimethylpentane equilibrated at room temperature,
0.233 milliliters 2,6-dimethylpyridine equilibrated at room temperature.

The contents of the round-bottom flask were equilibrated and Fourier Transform Infrared spectroscopy (FTIR) data were continuously acquired for roughly 10 minutes to establish a reference absorbance at 887 cm$^{-1}$ prior to addition of 8.2 milliliters isobutylene equilibrated at −60° C.

With continued stirring, next 1.82 milliliters titanium tetrachloride was charged to the flask. The reaction was allowed to proceed to high conversion, approximately 95 percent as determined by in situ Fourier Transform Infrared spectroscopy monitoring of the 887 cm$^{-1}$ peak of isobutylene. The procedure used for the Fourier Transform Infrared spectroscopy monitoring is given below. A pre-quench aliquot, approximately 5-10 milliliter, was removed from the flask using a glass pipette and charged into a scintillation vial containing 4 milliliters anhydrous methanol equilibrated at −60° C. to terminate the polymerization reaction. The aliquot was used to determine a baseline for the quenching reaction with the 1,2,2,6,6-pentamethyl piperidine and to provide a reference for structural and molecular weight characterization in the absence of quenching agent.

The polymerization reaction in the round-bottom flask was quenched by the addition of 0.71 milliliters 1,2,2,6,6-pentamethyl piperidine at an isobutylene conversion of 99 percent. Post-quench aliquots, approximately 5-10 milliliters, were terminated at various time intervals after the addition of the 1,2,2,6,6-pentamethyl piperidine by being placed in scintillation vials containing 4 milliliters anhydrous methanol equilibrated at −60° C.

The round-bottom flask was next charged with an appropriate amount methanol equilibrated at −60° C. to terminate the remaining polymerization reaction mixture at 90 minutes after the addition of 1,2,2,6,6-pentamethyl piperidine.

The aliquot samples and the final terminated reaction mixture were allowed to warm to room temperature, which allowed the volatile components to evaporate. To each aliquot sample 1-2 milliliter hexane was added and the polymer was precipitated in methanol. Polyisobutylene was recovered in each aliquot sample and agitated in using a vortex mixture with fresh methanol to remove any remaining contaminants, and the methanol was decanted. Polyisobutylene samples recovered in each aliquot were placed in a vacuum oven at room temperature for at least 24 hours to remove any remaining solvents.

The diluent used in Examples 1-5 and Comparative Examples A-E was a mixture of hexane and methyl chloride in a volume ratio of 60:40.

Polyisobutylene samples were analyzed using $^1$H Nuclear Magnetic Resonance Spectroscopy ($^1$H NMR) and Gel Permeation Chromatography (GPC) as described below.

Procedure for Fourier Transform Infrared Spectroscopy Monitoring of Isobutylene

The polymerization reaction was followed by Fourier Transform Infrared spectroscopy monitoring of isobutylene peak at 887 cm$^{-1}$. This procedure is described in R. F. Storey; Q. A. Thomas, *Macromolecules*, 36, 5065-5071, 2003.

Procedure for Collecting $^1$H NMR Data $^1$H NMR spectra were collected using a Bruker AC-300 (300 MHz) spectrophotometer using samples concentrations of 3 percent to 5 percent (weight/weight) in CDCl$_3$. $^1$H NMR spectra were used for analysis of the end groups. Fractions of exo-olefin, endo-olefin, tert-chloride and coupled olefin chain ends were obtained using $^1$H NMR integration as described in the following section.

Procedure for Collecting GPC Data

GPC data were used to determine number average molecular weight ($M_n$), weight average molecular weight ($M_w$) and Polydispersity index (PDI), i.e. $M_w/M_n$. GPC was also used to qualitatively detect olefin coupled product.

Procedure for Calculating the Fractional Amounts of Chain Ends on the Polyisobutylene Product The fractions of exo-olefin, endo-olefin, and tert-chloride chain ends, and EAS, di-EAS, and coupled products in the polyisobutylene samples were quantified using $^1$H NMR integration. It was assumed that these six species represent 100 percent of the chain ends. In some instances, EAS, di-EAS, and coupled products were deemed to be absent by qualitative inspection of the $^1$H NMR spectrum, and for di-EAS and coupled products, by confirming the absence of a shoulder on the low elution volume side of the main polymer peak in the GPC chromatogram. Two procedures are given below. The "General Procedure" was used when coupled product was detected; the "Special Procedure" was used when coupled product was deemed to be absent.

General Procedure

The fractional molar amount of each type of chain end was obtained using an equation analogous to the equation given below for determining the fractional amount of exo-olefin, $$F(\text{exo}) = (A_{exo})/(A_{exo} + A_{endo} + A_{tert-Cl} + A_{EAS} + 2A_{di-EAS} + 2A_{coupled}) \quad (1)$$

where $A_{endo}$ is the area of the single olefinic resonance at 5.15 ppm, $A_{exo}$ is the area of the exo-olefinic resonance 4.63 ppm, and $A_{tert-Cl}$ was calculated as follows:

$$A_{tert-Cl} = (A_{1.65-1.72}/6) - A_{endo} \quad (2)$$

where $A_{1.65-1.72}$ is the integrated area of the convoluted peaks associated with the gem-dimethyl protons of the endo-olefin and the tert-chloride chain ends. The integrated area of EAS or di-EAS product, when present, was evaluated on a situation-by-situation basis; the integration was determined based on a peak that is not convoluted by other peaks, and the area was normalized based on the number of protons that have that characteristic peak. It will be noted that a co-efficient of 2 appears in equation (1) for both di-EAS and coupled product, to account for the fact that creation of either of these products consumes 2 polyisobutylene chains. $A_{coupled}$ was calculated as follows:

$$A_{coupled} = (A_{5.0-4.75} - A_{4.5-4.75})/2 \quad (3)$$

where $A_{5.0-4.75}$ is the integrated area of the convoluted peaks associated with one of the exo-olefin protons and the two identical protons of the coupled product, and where $A_{4.5-4.75}$ is the integrated area of the peak associated with the other exo-olefin proton.

Special Procedure

In the qualitative absence of coupled product, the fractional molar amount of each type of chain end was obtained using an equation analogous to the equation given below for determining the fractional amount of exo-olefin, $$F(\text{exo}) = (A_{exo})/(A_{exo} + A_{endo} + A_{tert-Cl} + A_{EAS} + 2A_{di-EAS}) \quad (1)$$

where $A_{endo}$ is the area of the single olefinic resonance at 5.15 ppm, $A_{exo}$ is the average area of the two exo-olefinic resonances at 4.63 and 4.85 parts per million, and $A_{tert-Cl}$, $A_{EAS}$, and $A_{di-EAS}$ were calculated in the same manner as described in the "General Procedure."

Table I below summarizes the reactant quantities used in Examples 1-15 and Comparative Examples A-E.

Table II below summarizes the molar quantities of the reactants used in Examples 1-15 and Comparative Examples A-E.

Table III below summarizes the exo-olefin content of the polyisobutylene samples prepared in Examples 1-15 and Comparative Examples A-E. The data are given as mole percent of the total end groups.

Table IV below summarizes complete chain end compositions of polyisobutylene samples prepared in Examples 1-15 and Comparative Examples A-E.

The following abbreviations are used for the reactants in Tables I, II, III, and IV below:

TMPCI is an abbreviation of 2-chloro-2,4,4-trimethylpentane.
12266PMPip is an abbreviation of 1,2,2,6,6-pentamethylpiperidine.
NMDPA is an abbreviation of N-methyldiphenylamine.
2tBP is an abbreviation of 2-tert-butylpyridine.
TPA is an abbreviation of tripentylamine (mixture of isomers).
DPA is an abbreviation of diphenylamine.
TTA is an abbreviation of tri-p-tolylamine.
DMA is an abbreviation of N,N-dimethylaniline.
BET is an abbreviation of N-benzyl-N-ethyl-m-toluidine.
2,3DMQ is an abbreviation of 2,3-dimethylquinoxaline.
DDA is an abbreviation of 10,11-dihydro-5H-dibenz[b,f] azepine.
4,6DMP is an abbreviation of 4,6-dimethylpyrimidine.
246TT is an abbreviation of 2,4,6-triphenyl-1,3,5-triazine.
THA is an abbreviation of tri-n-hexylamine.
2PP is an abbreviation of 2-phenylpyridine.
DTA is an abbreviation of di-p-tolylamine.
TnBA is an abbreviation of tri-n-butylamine.
2266TMPip is an abbreviation for 2,2,6,6-tetramethylpiperadine.
NNDIPPA is an abbreviation of N,N-diisopropyl-3-pentylamine
12266TMPip/TiCl$_4$ is an abbreviation for the mixture of 1,2,2,6,6-pentamethylpiperadine and titanium tetrachloride.

TABLE I

| Example | Initiator | Initiator (g) | 2,6-Dimethyl pyridine (g) | Isobutylene (g) | Titanium Tetrachloride (g) | Quenching Agent | Quenching Agent (g) | Total Reaction Volume (L) | Total Diluent Volume (L) | Temperature (° C.) |
|---|---|---|---|---|---|---|---|---|---|---|
| 1 | TMPCI | 0.4163 | 0.2143 | 5.6110 | 3.1489 | 12266PMPip | 0.6087 | 0.200 | 0.189 | −60 |
| 2 | TMPCI | 0.4163 | 0.2143 | 5.6110 | 3.1489 | NMDPA | 0.7183 | 0.200 | 0.189 | −60 |
| 3 | TMPCI | 0.4163 | 0.2143 | 5.6110 | 3.1489 | 2tBP | 0.5300 | 0.200 | 0.189 | −60 |
| 4 | TMPCI | 0.417 | 0.212 | 5.611 | 3.149 | 2266TMPip | 0.792 | 0.201 | 0.19 | −60 |
| 5 | TMPCI | 0.417 | 0.214 | 5.611 | 3.149[a] | 12266PMPip/TiCl$_4$ | 0.871[b] | 0.201 | 0.19[c] | −60 |
| 6 | TMPCI | 0.0416 | 0.0214 | 1.1222 | 0.3149 | TPA | 0.1270 | 0.020 | 0.018 | −60 |

TABLE I-continued

| Example | Initiator | Initiator (g) | 2,6-Dimethyl pyridine (g) | Isobutylene (g) | Titanium Tetrachloride (g) | Quenching Agent | Quenching Agent (g) | Total Reaction Volume (L) | Total Diluent Volume (L) | Temperature (° C.) |
|---|---|---|---|---|---|---|---|---|---|---|
| 7 | TMPCI | 0.0416 | 0.0214 | 1.1222 | 0.3149 | DPA | 0.0948 | 0.020 | 0.018 | −60 |
| 8 | TMPCI | 0.0416 | 0.0214 | 1.1222 | 0.3149 | TTA | 0.1610 | 0.020 | 0.018 | −60 |
| 9 | TMPCI | 0.0416 | 0.0214 | 1.1222 | 0.3149 | DMA | 0.0679 | 0.020 | 0.018 | −60 |
| 10 | TMPCI | 0.0416 | 0.0214 | 1.1222 | 0.3149 | BET | 0.1260 | 0.020 | 0.018 | −60 |
| 11 | TMPCI | 0.0416 | 0.0214 | 1.1222 | 0.3149 | 2,3DMQ | 0.0860 | 0.020 | 0.018 | −60 |
| 12 | TMPCI | 0.0416 | 0.0214 | 1.1222 | 0.3149 | DDA | 0.1090 | 0.020 | 0.018 | −60 |
| 13 | TMPCI | 0.0416 | 0.0214 | 1.1222 | 0.3149 | 4,6DMP | 0.0610 | 0.020 | 0.018 | −60 |
| 14 | TMPCI | 0.0416 | 0.0214 | 1.1222 | 0.3149 | 246TT | 0.1730 | 0.020 | 0.018 | −60 |
| 15 | TMPCI | 0.417 | 0.214 | 5.611 | 3.149 | NNDIPPA | 0.961 | 0.202 | 0.19 | −60 |
| A | TMPCI | 0.0416 | 0.0214 | 1.1222 | 0.3149 | THA | 0.1510 | 0.020 | 0.018 | −60 |
| B | TMPCI | 0.0416 | 0.0214 | 1.1222 | 0.3149 | 2PP | 0.0870 | 0.020 | 0.018 | −60 |
| C | TMPCI | 0.0416 | 0.0214 | 1.1222 | 0.3149 | Quinaldine | 0.0800 | 0.020 | 0.018 | −60 |
| D | TMPCI | 0.0416 | 0.0214 | 1.1222 | 0.3149 | DTA | 0.1100 | 0.020 | 0.018 | −60 |
| E | TMPCI | 0.0416 | 0.0214 | 1.1222 | 0.3149 | TnBA | 0.1040 | 0.020 | 0.018 | −60 |

[a]2.087 grams (66.3%) of the total TiCl$_4$ was used to catalyze the polymerization of isobutylene; 1.062 grams (33.7%) was pre-reacted with the 12266PMPip.
[b]12266PMPip was pre-reacted with 1.062 grams of TiCl$_4$ and 0.0475 liters diluent for 33 minutes prior to its addition to the polymerization reactor.
[c]0.1425 liters (75%) of the total diluent was diluted to dilute the polymerization of isobutylene; 0.475 liters (25%) was used to dilute the 12266PMPip/TiCl$_4$ pre-reaction.

TABLE II

| Example | Initiator | Initiator (M) | 2,6-Dimethyl pyridine (M) | Isobutylene (M) | Titanium Tetrachloride (M) | Quenching Agent | Quenching Agent (M) | Total Reaction Volume (L) | Total Diluent Volume (L) | Temperature (° C.) |
|---|---|---|---|---|---|---|---|---|---|---|
| 1 | TMPCI | 0.014 | 0.010 | 0.500 | 0.083 | 12266PMPip | 0.0196 | 0.200 | 0.189 | −60 |
| 2 | TMPCI | 0.014 | 0.010 | 0.500 | 0.083 | NMDPA | 0.0196 | 0.200 | 0.189 | −60 |
| 3 | TMPCI | 0.014 | 0.010 | 0.500 | 0.083 | 2tBP | 0.0196 | 0.200 | 0.189 | −60 |
| 4 | TMPCI | 0.014 | 0.010 | 0.500 | 0.083 | 2266TMPip | 0.028 | 0.201 | 0.19 | −60 |
| 5 | TMPCI | 0.018[a] (0.014) | 0.013[a] (0.010) | 0.655[a] (0.500) | 0.072[a] (0.083) | 12266PMPip/ TiCl$_4$ | 0.028[b] | 0.201[c] | 0.19[c] | −60 |
| 6 | TMPCI | 0.014 | 0.010 | 1.0 | 0.083 | TPA | 0.028 | 0.020 | 0.018 | −60 |
| 7 | TMPCI | 0.014 | 0.010 | 1.0 | 0.083 | DPA | 0.028 | 0.020 | 0.018 | −60 |
| 8 | TMPCI | 0.014 | 0.010 | 1.0 | 0.083 | TTA | 0.028 | 0.020 | 0.018 | −60 |
| 9 | TMPCI | 0.014 | 0.010 | 1.0 | 0.083 | DMA | 0.028 | 0.020 | 0.018 | −60 |
| 10 | TMPCI | 0.014 | 0.010 | 1.0 | 0.083 | BET | 0.028 | 0.020 | 0.018 | −60 |
| 11 | TMPCI | 0.014 | 0.010 | 1.0 | 0.083 | 2,3DMQ | 0.028 | 0.020 | 0.018 | −60 |
| 12 | TMPCI | 0.014 | 0.010 | 1.0 | 0.083 | DDA | 0.028 | 0.020 | 0.018 | −60 |
| 13 | TMPCI | 0.014 | 0.010 | 1.0 | 0.083 | 4,6DMP | 0.028 | 0.020 | 0.018 | −60 |
| 14 | TMPCI | 0.014 | 0.010 | 1.0 | 0.083 | 246TT | 0.028 | 0.020 | 0.018 | −60 |
| 15 | TMPCI | 0.014 | 0.010 | 0.5 | 0.083 | NNDIPPA | 0.028 | 0.202 | 0.19 | −60 |
| A | TMPCI | 0.014 | 0.010 | 1.0 | 0.083 | THA | 0.028 | 0.020 | 0.018 | −60 |
| B | TMPCI | 0.014 | 0.010 | 1.0 | 0.083 | 2PP | 0.028 | 0.020 | 0.018 | −60 |
| C | TMPCI | 0.014 | 0.010 | 1.0 | 0.083 | Quinaldine | 0.028 | 0.020 | 0.018 | −60 |
| D | TMPCI | 0.014 | 0.010 | 1.0 | 0.083 | DTA | 0.028 | 0.020 | 0.018 | −60 |
| E | TMPCI | 0.014 | 0.010 | 1.0 | 0.083 | TnBA | 0.028 | 0.020 | 0.018 | −60 |

[a]Concentration during IB polymerization; number in parenthesis is final concentration after polymerization reaction and quencher/TiCl$_4$ pre-reaction were combined.
[b]Final concentration after polymerization reaction and quencher/TiCl$_4$ pre-reaction were combined.
[c]Final volume after polymerization reaction and quencher/TiCl$_4$ pre-reaction were combined.

Example 2

Preparation of Polyisobutylene Using a Mono-Functional Initiator and N-methyldiphenylamine Polyisobutylene was prepared as described in Example 1 and using the conditions listed in table 1. Example 2 conditions are identical to Example 1 conditions except that the quenching agent was N-methyldiphenylamine in stead of 1,2, 2,6,6-pentamethylpiperidine.

The polyisobutylene samples were collected and analyzed as described above for the Example 1 polyisobutylene samples.

Table III below summarizes the data obtained at various times intervals after the addition of the quenching agents. The actual time for collecting the aliquots samples, in minutes, was within a few minutes, 1-5 minutes, of the time given in Table III.

Example 3

Preparation of Polyisobutylene Using a Mono-Functional Initiator and 2-Tert-butylpyridine Polyisobutylene was prepared as described in Example 1 and using the conditions listed in table 1. Example 3 conditions are identical to Example 1 conditions except that the quenching agent was 2-tert-butylpyridine instead of 1,2,2,6,6-pentamethyl piperidine.

The polyisobutylene samples were collected and analyzed as described above for the Example 1 polyisobutylene samples.

Example 4

Preparation of Polyisobutylene Using a Mono-Functional Initiator and 2,2,6,6-tetramethylpiperidine Polyisobutylene was prepared as described in Example 1 and using the conditions listed in table 1. Example 4 conditions are similar to example 1 conditions except that the quencher was 2,2,6,6-tetramethylpiperidine, and it was used at a concentration two times that of the chain end concentration.

The polyisobutylene samples were collected and analyzed as described above for the Example 1 polyisobutylene samples.

Table III below summarizes the data obtained at various times intervals after the addition of the quenching agents.

Example 5

Preparation of Polyisobutylene Using a Mono-Functional Initiator and 1,2,2,6,6-pentamethylpiperidine—Pre-reaction of 1,2,2,6,6-pentamethylpiperidine with Titanium Tetrachloride Prior to Quenching The reactor configuration, ATR-FTIR probe and conduit, FTIR spectrometer and spectroscopic method and analysis, constant-temperature heptane bath, and glovebox were the same as described in Example 1. A 250-milliliter reactor flask was charged with the following reactants:
85.5 milliliters hexane equilibrated at −60° C.,
57 milliliters methyl chloride equilibrated at −60° C.,
0.23 milliliters 2,6-dimethylpyridine equilibrated at room temperature, and
0.48 milliliters 2-chloro-2,4,4-trimethyl pentane equilibrated at room temperature.

A reference absorbance at 887 cm$^{-1}$ was established and then 8.18 milliliters isobutylene equilibrated at −60° C. was charged to the 250-milliliter reactor flask.

A separate 2-neck 500-milliliter flask was charged with the following reactants:
28.5 milliliters hexane equilibrated at −60° C.,
19 milliliters methyl chloride equilibrated at −60° C., and
1.02 milliliters 1,2,2,6,6-pentamethylpiperidine equilibrated at room temperature.

Both flasks were equilibrated in the −60° C. heptane bath.

Next, 1.2 milliliters titanium tetrachloride was charged to the 250-milliliter reactor flask. Then, 0.62 milliliters titanium tetrachloride was charged to the 500-milliliter flask.

After a polymerization time of 33 minutes, a pre-quench aliquot (5-10 milliliter) was removed from the contents of the 250-milliliter reactor flask and terminated with 10-15 milliliters per-chilled methanol, and then the polymerization was quenched by pouring the contents of the 500-milliliter flask into the 250-milliliter reactor flask. Aliquots were removed at 1, 3, 5, 8, 15, and 30 minutes and terminated with pre-chilled methanol. The balance of the reactor contents was terminated at 60 minutes using pre-chilled methanol.

The polyisobutylene samples were collected and analyzed as described above for the Example 1 polyisobutylene samples.

Example 6

Preparation of Polyisobutylene Using a Mono-Functional Initiator and Tripentylamine Composed of Mixed Isomers (TPA)

A four-neck 250 milliliter round-bottom flask was equipped with an overhead mechanical stirrer and platinum resistance thermometer. This assembly was immersed into a heptane bath at −60° C. under dry nitrogen gas in a substantially inert atmosphere glovebox. The flask was then charged with the following reactants:
108 milliliters hexane equilibrated at −60° C.,
72 milliliters methyl chloride equilibrated at −60° C.,
0.48 milliliters 2-chloro-2,4,4-trimethyl pentane equilibrated at room temperature,
0.23 milliliters 2,6-dimethylpyridine equilibrated at room temperature,
16.4 milliliters of isobutylene equilibrated at −60° C.

The contents of the round-bottom flask were equilibrated at −60° C.

With continued stirring, next 1.82 milliliters titanium tetrachloride was charged to the flask. The reaction was allowed to proceed 12 minutes and then 20 milliliters of the polymerization solution was charged to 4 separate 60 milliliter test tubes, equipped with threaded caps.

The polymerization was allowed to continue in each test tube for 4 additional minutes (16 total reaction minutes) at which point 1 of the 4 tubes was terminated with 5 milliliters of methanol to provide a comparative example prior to addition of quenching agents. The remaining 3 solutions were allowed to proceed 8 minutes with intermittent shaking (24 total reaction minutes), at which time 0.1270 grams tripentylamine (a mixture of isomers) was added to one of the test tubes containing a reactive polymerization. After addition of TPA, 1 of the remaining polymerizations was terminated with 5 milliliters of methanol to provide another comparative example. The TPA quenching reaction was allowed to proceed 15 minutes at which time 5 milliliters of methanol was charged in order to terminate the reaction. The final non quenched polymerization test tube was then terminated with 5 milliliters of methanol to provide a final comparative example. Non-quencher containing reactions were used to provide a comparative baseline for the quenching reactions and to provide references for structural and molecular weight characterization in the absence of a quenching agent.

The molar quantities of the reactants in the final reaction mixture are given below in Table II and the exo-olefin results for various time intervals are summarized in Table III.

Examples 7-14

Preparation of Polyisobutylene Using a Mono-Functional Initiator and Various Quenching Agents Polyisobutylene was prepared according to the procedure described in example 6 above but using various quenching agents other than TPA. The following quenching agents (examples 7-14) were evaluated and yielded exo-olefin PIB: diphenylamine (DPA), tri-p-tolylamine (TTA), N,N-dimethylaniline (DMA), N-benzyl-N-ethyl-m-toluidine (BET), 2,3-dimethylquinoxaline (23DMQ), 10,11-dihydro-5H- dibenz[b,f]azepine (DDA), 4,6-dimethylpyrimidine (46DMP), and 2,4,6-triphenyl-1,3,5-triazine (246TT).

The reactant quantities for examples 7-14 are listed in Table 1. The molar quantities of the reactants in the final reaction mixture are given below in Table II and the exo-olefin results for various time intervals are summarized in Table III.

Example 15

Preparation of Polyisobutylene Using a
Mono-Functional Initiator and
N,N-diisopropyl-3-pentylamine Polyisobutylene was prepared according to the procedure of Example 1 using the conditions listed in Table 1. Example 15 conditions are identical to Example 4 conditions except that the quencher was N,N-diisopropyl-3-pentylamine.

The polyisobutylene samples were collected and analyzed as described above for the Example 1 polyisobutylene samples.

Table III below summarizes the data obtained at various times intervals after the addition of the quenching agents.

Comparative Examples A-E

Preparation of Polyisobutylene Using a
Mono-Functional Initiator and Various Quenching
Agents Polyisobutylene was prepared according to the procedure described in example 6 above but using various quenching agents other than TPA. The comparative examples represent secondary and tertiary amines which did not yield exo-olefin PIB above that of the PIB generated in the control aliquot.

The reactant quantities for examples A-E are listed in Table 1. The molar quantities of the reactants in the final reaction mixture are given below in Table II and the exo-olefin results for various time intervals are summarized in Table III.

TABLE III

| | | Quench Time (minutes after the addition of the quenching agent) | | | | | | | |
|---|---|---|---|---|---|---|---|---|---|
| | | ~0 | ~15 | ~30 | ~45 | ~50–60 | ~75 | ~90 | ~180 |
| | | Exo-olefin | | | | | | | |
| Example | Quenching Agent | (% of total chain ends) | | | | | | | |
| 1 | 1,2,2,6,6-pentamethyl piperidine | 1 | 79 | 81 | 90 | 87 | 93 | 91 | N/A |
| 2 | N-methyl diphenylamine | 0 | 85 | 86 | 84 | 85 | 84 | 84 | 84 |
| 3 | 2-tertbutyl pyridine | 3 | 62 | 65 | 69 | 66 | 67 | 68 | N/A |
| 4 | 2,2,6,6-tetramethylpiperidine | 3 | 96 | 96 | N/A | 96 | N/A | N/A | N/A |
| 5 | 12266PMPip/TiCl$_4$ | 11 | 76 | 76 | N/A | 76 | N/A | N/A | N/A |
| 6 | TPA | 7 | N/A | N/A | 22 | N/A | N/A | N/A | N/A |
| 7 | DPA | 7 | 50 | N/A | N/A | N/A | N/A | N/A | N/A |
| 8 | TTA | 7 | 70 | N/A | N/A | N/A | N/A | N/A | N/A |
| 9 | DMA | 7 | 61 | N/A | N/A | N/A | N/A | N/A | N/A |
| 10 | BET | 7 | 63 | N/A | N/A | N/A | N/A | N/A | N/A |
| 11 | 2,3DMQ | 7 | 94 | N/A | N/A | N/A | N/A | N/A | N/A |
| 12 | DDA | 7 | 99 | N/A | N/A | N/A | N/A | N/A | N/A |
| 13 | 4,6DMP | 7 | 69 | N/A | N/A | N/A | N/A | N/A | N/A |
| 14 | 246TT | 7 | 67 | N/A | N/A | N/A | N/A | N/A | N/A |
| 15 | N,N-diisopropyl-3-pentaylamine | 0 | N/A | 10 | N/A | N/A | N/A | N/A | N/A |
| A | THA | 7 | 7 | N/A | N/A | N/A | N/A | N/A | N/A |
| B | 2PP | 7 | 7 | N/A | N/A | N/A | N/A | N/A | N/A |
| C | Quinaldine | 7 | 7 | N/A | N/A | N/A | N/A | N/A | N/A |
| D | DTA | 7 | 7 | N/A | N/A | N/A | N/A | N/A | N/A |
| E | TnBA | 7 | 7 | N/A | N/A | N/A | N/A | N/A | N/A |

TABLE IV

Composition of Chain Ends after 90 minutes of Quenching[b]

| | | Quenching Agent | Exo-Olefin Chain End (%) | Endo-Olefin Chain End (%) | Tert-Cl Chain End (%) | EAS Chain End (%) | di-EAS Chain End (%) | Coupled Product (%) | Reaction Temperature (° C.) |
|---|---|---|---|---|---|---|---|---|---|
| Examples | 1 | 1,2,2,6,6-pentamethylpiperidine | 91 | 0 | 3 | 0 | 0 | 6 | −60 |
| | 2 | N-methyldiphenylamine | 84 | 0 | 0 | 15 | N/A | 1 | −60 |
| | 3 | 2-tert-butylpyridine | 68 | 0 | 0 | 0 | 0 | 32 | −60 |
| | 4 | 2,2,6,6-tetramethylpiperidine | 96 | 0 | <2 | 0 | 0 | <2 | −60 |
| | 5 | 12266PMPip/TiCl$_4$[c] | 76 | <1 | 20 | 0 | 0 | <3 | −60 |
| | 6 | TPA[d] | 22 | <2 | 75 | 0 | 0 | 0 | −60 |

TABLE IV-continued

Composition of Chain Ends after 90 minutes of Quenching[b]

| Quenching Agent | Exo-Olefin Chain End (%) | Endo-Olefin Chain End (%) | Tert-Cl Chain End (%) | EAS Chain End (%) | di-EAS Chain End (%) | Coupled Product (%) | Reaction Temperature (° C.) |
|---|---|---|---|---|---|---|---|
| 7 DPA[e] | 50 | <1 | 46 | 0 | 0 | <3 | −60 |
| 8 TTA[e] | 70 | <1 | 23 | 0 | 0 | 7 | −60 |
| 9 DMA[d] | 61 | <1 | 38 | 0 | 0 | 0 | −60 |
| 10 BET[e] | 63 | <1 | 36 | 0 | 0 | <1 | −60 |
| 11 2,3DMQ[e] | 94 | <2 | <1 | N/A | N/A | <2 | −60 |
| 12 DDA[e] | 99 | <1 | <1 | 0 | 0 | <1 | −60 |
| 13 4,6DMP[e] | 69 | <1 | 24 | 0 | 0 | 6 | −60 |
| 14 246TT[e] | 67 | <1 | 32 | N/A | N/A | <1 | −60 |
| 15 N,N-diisopropyl-3-pentylamine[a] | 17 | 0 | 82 | 0 | 0 | 1 | −60 |
| A THA[d] | 8 | <1 | 89 | 0 | 0 | <2 | −60 |
| B 2PP[e] | 8 | <1 | 89 | 0 | 0 | <2 | −60 |
| C Quinaldine[e] | 8 | <1 | 89 | 0 | 0 | <2 | −60 |
| D DTA[e] | 8 | <1 | 89 | 0 | 0 | <2 | −60 |
| E TnBA[d] | 8 | <1 | 89 | 0 | 0 | <2 | −60 |

N/A The di-EAS chain end data for N-methyldiphenylamine is not available.
[a]quenching time was 180 minutes.
[b]quenching time was 90 minutes.
[c]quenching time was 60 minutes.
[d]quenching time was 45 minutes.
[e]quenching time was 15 minutes.

What is claimed is:

1. A method for preparing a polyolefin containing one or more exo-olefinic end groups on the polymer chain from a monomer, comprising quenching a cationic quasi-living polyolefin polymer system with one or more hindered secondary or tertiary amines containing only carbon, hydrogen, and nitrogen atoms, provided the hindered secondary or tertiary amines are not:
   (a) Triethylamine;
   (b) Tri-n-butylamine;
   (c) Trihexylamine;
   (d) Triisooctylamine;
   (e) 2-phenylpyridine;
   (f) 2,3-cyclododenopyridine;
   (g) Di-p-tolylamine;
   (h) Quinaldine; and
   (i) 1-pyrrolidino-1-cyclopentene
wherein said quenching comprises addition of said one or more hindered secondary or tertiary amines containing only carbon, hydrogen, and nitrogen atoms to said cationic quasi-living polyolefin polymer system after high conversion of the monomer has occurred.

2. The method of claim 1, wherein the quenching of the cationic quasi-living polyolefin polymer system is at a temperature in the range of about −130° C. to about 10° C.

3. The method of claim 2, wherein the quenching is carried out at a temperature in the range of about −80° C. to about 0° C.

4. The method of claim 3, wherein the quenching is carried out at a temperature in the range of about −70° C. to about −10° C.

5. The method of claim 4, wherein the quenching is carried out at a temperature in the range of from about −60° C. to about −20° C.

6. The method of claim 1, wherein the polyolefin is prepared in situ.

7. The method of claim 1, wherein the polyolefin is polyisobutylene.

8. The method of claim 1, wherein the hindered secondary or tertiary amine has the general formula:

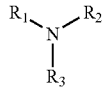

wherein $R_1$, $R_2$ and $R_3$ are independently hydrogen, alkyl containing one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or at least one of $R_1$ and $R_2$, $R_2$ and $R_3$ and $R_3$ and $R_1$, taken in pairs, independently form a fused aliphatic ring of from about 4 carbon atoms to about 8 carbon atoms; providing that no more than one of $R_1$, $R_2$ and $R_3$ is hydrogen, and provided that $R_1$, $R_2$, and $R_3$ are not all linear alkyl of about 3 carbons or less.

9. The method of claim 1, wherein the hindered amine is a tertiary amine of the general formula:

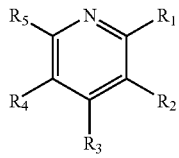

wherein one of $R_1$ and $R_5$ is hydrogen and the other is a branched alkyl of about 3 to about 20 carbon atoms, aryl of about 10 to about 30 carbon atoms, or aralkyl of about 11 to about 30 carbon atoms; $R_2$, $R_3$ and $R_4$ are independently hydrogen, alkyl of one carbon atom to about 20 carbon atoms, cycloalkyl of about 3 to about 7 carbon atoms, aryl of about 6 to about 30 carbon atoms, alkaryl of about 7 to about 30 carbon atoms, or aralkyl of about 7 to about 30 carbon atoms; or at least one of $R_1$ and $R_2$, and $R_3$ and $R_4$, and $R_4$ and $R_5$, taken in pairs, independently form a fused aromatic ring of from 5 carbon atoms to 7 carbon atoms or aliphatic ring of from about 4 carbon atoms to about 8 carbon atoms, provided that if $R_1$ and $R_2$ form a fused aliphatic or aromatic ring, then $R_5$ is a branched alkyl of about 3 to about 20 carbon atoms, aryl of about 10 to about 30 carbon atoms, or aralkyl of about 11 to about 30 carbon atoms, and provided that if $R_4$ and $R_5$ form a fused aliphatic or aromatic ring, then $R_1$ is a branched alkyl of about 3 to about 20 carbon atoms, aryl of about 10 to about 30 carbon atoms, or aralkyl of about 11 to about 30 carbon atoms.

10. The method of claim 9, wherein $R_1$ is hydrogen and $R_5$ is tert-butyl and $R_2$, $R_3$ and $R_4$ are hydrogen.

11. The method of claim 1, wherein the quasi-living polyolefin polymer is formed by contacting at least one cationically polymerizable monomer with an initiator, in the presence of a Lewis acid under reaction conditions suitable for quasi-living polymerization.

12. The method of claim 11, wherein the at least one cationically polymerizable monomer comprises at least one of isobutylene, 2-methyl-1-butene, 3-methyl-1-butene, 4-methyl-1-pentene, and beta-pinene.

13. The method of claim 12, wherein the at least one cationically polymerizable monomer is isobutylene.

14. The method of claim 13, wherein two or more different cationically polymerizable monomers are employed.

15. The method of claim 11, wherein the initiator is multifunctional.

16. The method of claim 15, wherein the initiator is difunctional.

17. The method of claim 16, wherein the di-functional initiator comprises at least one of 1,3-di(2-chloro-2-propyl)-5-tert-butylbenzene,
   1,4-di(2-chloro-2-propyl)benzene and
   1,4-di(2-acetoxy-2-propyl)benzene,
   1,3-di(2-acetoxy-2-propyl)-5-tert-butylbenzene,
   1,3-di(2-methoxy-2-propyl)-5-tert-butylbenzene and
   1,4-di(2-methoxy-2-propyl)benzene.

18. The method of claim 11, wherein the initiator is monofunctional.

19. The method of claim 18, wherein the mono-functional initiator comprises at least one of 2-chloro-2-phenylpropane; 2-acetoxy-2-phenylpropane; 2-propionoxy-2-phenylpropane, 2-methoxy-2-phenylpropane, 2-ethoxy-2-phenylpropane, 2-chloro-2,4,4-trimethylpentane, 2-acetoxy-2,4,4-trimethylpentane, 2-propionoxy-2,4,4-trimethylpentane, 2-methoxy-2,4,4-trimethylpentane, and 2-ethoxy-2,4,4-trimethylpentane.

20. The method of claim 1, wherein the molecular weight distribution, $M_w/M_n$, of the polyolefin polymer is present in the range of about 1.01 to about 3.0.

21. The method of claim 20, wherein the molecular weight distribution, $M_w/M_n$, of the polyolefin polymer is present in the range of about 1.1 to about 2.0.

22. The method of claim 21, wherein the molecular weight distribution, $M_w/M_n$, of the polyolefin polymer is less than 1.5.

23. The method of claim 1, wherein the polyolefin has at least 20 percent exo-olefin end groups.

24. The method of claim 1, wherein the polyolefin has at least 50 percent exo-olefin end groups.

25. The method of claim 1, wherein the product has at least 70 percent exo-olefin end groups.

26. A method for preparing a polyolefin containing one or more exo-olefinic end groups on the polymer chain from a monomer, comprising quenching a cationic quasi-living polyolefin polymer system with one or more hindered secondary or tertiary amines containing only carbon, hydrogen, and nitrogen atoms, wherein the hindered secondary or tertiary amine compounds are pre-reacted with a Lewis acid, and provided the hindered secondary or tertiary amines are not:
   (a) Triethylamine;
   (b) Tri-n-butylamine;
   (c) Trihexylamine;
   (d) Triisooctylamine;
   (e) 2-phenylpyridine;
   (f) 2,3-cyclododenopyridine;
   (g) Di-p-tolylamine;
   (h) Quinaldine; and
   (i) 1-pyrrolidino-1-cyclopentene
and wherein said quenching comprises addition of said one or more hindered secondary or tertiary amines containing only carbon, hydrogen, and nitrogen atoms to said cationic quasi-living polyolefin polymer system after high conversion of the monomer has occurred.

27. The above method of claim 26, wherein the Lewis acid is titanium tetrachloride.

28. A method for preparing a polyolefin containing one or more exo-olefinic end groups on the polymer chain, comprising guenching a cationic quasi-living polyolefin polymer system with one or more hindered secondary or tertiary amines containing only carbon, hydrogen, and nitrogen atoms, provided the hindered secondary or tertiary amines are not:
   (a) Triethylamine;
   (b) Tri-n-butylamine;
   (c) Trihexylamine;
   (d) Triisooctylamine;
   (e) 2-phenylpyridine;
   (f) 2,3-cyclododenopyridine;
   (g) Di-p-tolylamine;
   (h) Quinaldine; and
   (i) 1-pyrrolidino-1-cyclopentene,
wherein the hindered amine is a nitrogen containing heteroaromatic having the following formulas, (a), (b) or (c) or mixtures thereof

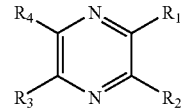

(a)

wherein in formula (a)
   one of $R_1$ and $R_4$ is hydrogen and the other is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, one of $R_2$ and $R_3$ is hydrogen and the other is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms; or at least one of $R_1$ and $R_2$ and $R_3$ and $R_4$, taken in pairs, independently form a fused aromatic ring of from 5 carbon atoms to 7 carbon atoms or aliphatic ring of from about 4 carbon atoms to about 8 carbon atoms;

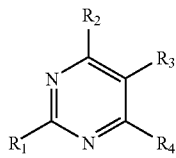

(b)

wherein in formula (b)

$R_1$, $R_2$ and $R_4$ are independently hydrogen or alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, $R_3$ is hydrogen, alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms; or at least one of $R_2$ and $R_3$ or $R_3$ and $R_4$, taken in pairs, independently form a fused aromatic ring of from 5 carbon atoms to 7 carbon atoms or aliphatic ring of from about 4 carbon atoms to about 8 carbon atoms, provided that if $R_1$ is hydrogen then $R_2$ and $R_4$ are independently alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms, and further provided that if $R_2$ or $R_4$ is hydrogen, then $R_1$ is alkyl of one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms; and

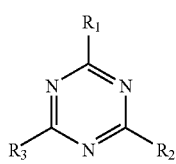

(c)

wherein in formula (c)

$R_1$, $R_2$ and $R_3$ are independently hydrogen or alkyl of one carbon to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbon atoms.

29. The method of claim 28, where the hindered amine has the formula:

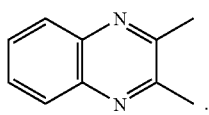

30. The method of claim 28, where the hindered amine has the formula:

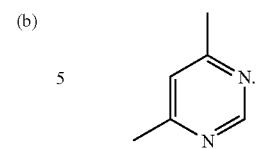

31. The method of claim 28, where the hindered amine has the formula:

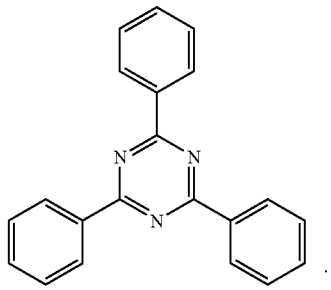

32. The method of claim 1, wherein the polyolefin is prepared by quenching a quasi-living polyolefin polymer product containing terminal tert-chloride chain ends or a mixture of terminal tert-chloride chain ends and terminal olefinic chain ends in the presence of a Lewis acid.

33. The method of claim 32, wherein the quasi-living polyolefin polymer product contains terminal tert-chloride chain ends.

34. The method of claim 32, wherein the Lewis acid is a titanium or boron halide.

35. The method of claim 34, wherein the Lewis acid is titanium halide.

36. The method of claim 34, wherein the Lewis acid is titanium tetrachloride.

37. A method for preparing a polyolefin containing one or more exo-olefinic end groups on the polymer chain, comprising quenching a cationic quasi-living polyolefin polymer system with one or more hindered secondary or tertiary amines containing only carbon, hydrogen, and nitrogen atoms, provided the hindered secondary or tertiary amines are not:

(a) Triethylamine;
(b) Tri-n-butylamine;
(c) Trihexylamine;
(d) Triisooctylamine;
(e) 2-phenylpyridine;
(f) 2,3-cyclododenopyridine;
(g) Di-p-tolylamine;
(h) Quinaldine; and
(i) 1-pyrrolidino-1-cyclopentene wherein said one or more hindered secondary or tertiary amines containing only carbon, hydrogen, and nitrogen atoms is selected from the group consisting of:

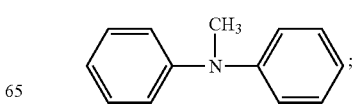

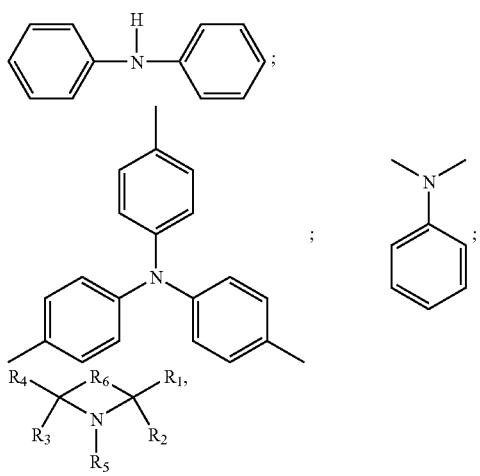

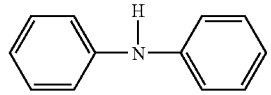

wherein $R_6$ is a divalent hydrocarbyl group of one carbon atom to about 4 carbon atoms, each of which may be substituted with an alkyl group having one carbon atom to about 6 carbon atoms, and $R_1$, $R_2$, $R_3$, $R_4$ and $R_5$ are independently hydrogen, alkyl containing one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbons; provided if $R_1$, $R_2$, $R_3$, and $R_4$ are hydrogen, then $R_5$ is a branched alkyl having from about 4 to about 20 carbon atoms, aryl of about 6 to about 30 carbon atoms, or aralkyl of about 7 to about 30 carbon atoms, and provided if $R_5$ is hydrogen, then $R_1$, $R_2$, $R_3$, and $R_4$, cannot be hydrogen unless either $R_1$ or $R_2$ and either $R_3$ or $R_4$ is a branched alkyl from about 4 to about 20 carbon atoms; and

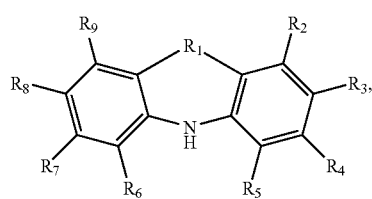

wherein $R_1$ is a divalent hydrocarbyl group of one carbon atom to about 4 carbons and $R_2$, $R_3$, $R_4$, $R_7$, $R_8$, and $R_9$ are independently hydrogen, alkyl containing one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbons, and one of $R_5$ and $R_6$ is hydrogen and the other is linear alkyl from one carbon atom to about 20 carbon atoms.

38. The method of claim 37, wherein the hindered amine is a tertiary amine of the formula:

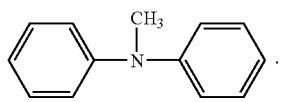

39. The method of claim 37, wherein the hindered amine is a secondary amine of the formula:

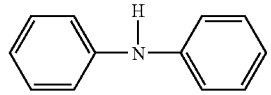

40. The method of claim 37, wherein the hindered amine is a tertiary amine of the formula:

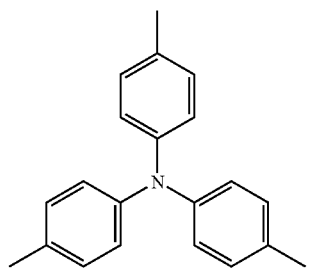

41. The method of claim 37 wherein the hindered amine is a tertiary amine of the formula:

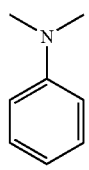

42. The method of claim 37, wherein the hindered amine is a tertiary or secondary amine having the general formula:

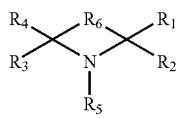

wherein $R_6$ is a divalent hydrocarbyl group of one carbon atom to about 4 carbon atoms, each of which may be substituted with an alkyl group having one carbon atom to about 6 carbon atoms, and $R_1$, $R_2$, $R_3$, $R_4$ and $R_5$ are independently hydrogen, alkyl containing one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbons; provided if $R_1$, $R_2$, $R_3$, and $R_4$ are hydrogen, then $R_5$ is a branched alkyl having from about 4 to about 20 carbon atoms, aryl of about 6 to about 30 carbon atoms, or aralkyl of about 7 to about 30 carbon atoms, and provided if $R_5$ is hydrogen, then $R_1$, $R_2$, $R_3$, and $R_4$, cannot be hydrogen unless either $R_1$ or $R_2$ and either $R_3$ or $R_4$ is a branched alkyl from about 4 to about 20 carbon atoms.

43. The method of claim 42, wherein the hindered amine is a secondary or tertiary amine of the formula:

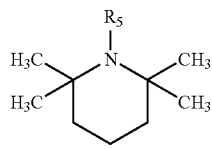

wherein $R_5$ is hydrogen or methyl.

44. The method of claim 37, wherein the hindered secondary or tertiary amine has the general formula:

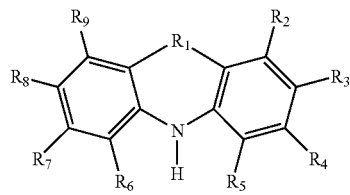

wherein $R_1$ is a divalent hydrocarbyl group of one carbon atom to about 4 carbons and $R_2$, $R_3$, $R_4$, $R_7$, $R_8$, and $R_9$ are independently hydrogen, alkyl containing one carbon atom to about 20 carbon atoms, cycloalkyl of about 3 to about 8 carbon atoms, aryl of about 6 to about 30 carbon atoms, alkaryl of about 7 to about 30 carbon atoms, or aralkyl of about 7 to about 30 carbons, and one of $R_5$ and $R_6$ is hydrogen and the other is linear alkyl from one carbon atom to about 20 carbon atoms.

45. The method of claim 44, wherein one of $R_5$ an $R_6$ is hydrogen.

46. The method of claim 44, wherein the amine has the formula:

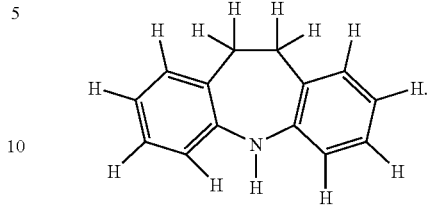

47. A method for preparing a polyolefin containing one or more exo-otefinic end groups on the polymer chain, comprising quenching a cationic quasi-living polyolefin polymer system with one or more hindered secondary or tertiary amines containing only carbon, hydrogen, and nitrogen atoms, wherein the hindered secondary or tertiary amine compounds are pre-reacted with a Lewis acid, and provided the hindered secondary or tertiary amines are not:
  (a) Triethylamine;
  (b) Tri-n-butylamine;
  (c) Trihexylamine;
  (d) Triisooctylamine;
  (e) 2-phenylpyridine;
  (f) 2,3-cyclododenopyridine;
  (g) Di-p-tolylamine;
  (h) Quinaldine; and
  (i) 1-pyrrolidino-1-cyclopentene,
wherein the hindered amine is selected from the group consisting of 1,2,2,6,6-pentamethylpiperidine and 2,2,6,6-tetramethylpiperidine.

48. The method of claim 47, wherein the hindered amine is 1,2,2,6,6-pentamethylpiperidine.

49. The method of claim 47, wherein the Lewis acid is titanium tetrachloride and the hindered secondary or tertiary amine is 2,2,6,6-tetramethylpiperidine.

* * * * *